United States Patent
Ushijima et al.

(10) Patent No.: US 8,434,690 B2
(45) Date of Patent: May 7, 2013

(54) TWO-DIMENSIONAL CODE HAVING RECTANGULAR REGION PROVIDED WITH SPECIFIC PATTERNS FOR SPECIFICATION OF CELL POSITIONS AND DISTINCTION FROM BACKGROUND

(75) Inventors: Takao Ushijima, Okazaki (JP); Hiroaki Mizukoshi, Kitanagoya (JP); Hayato Kita, Takahama (JP)

(73) Assignee: Denso Wave Incorporated, Tokyo (JP)

( * ) Notice: Subject to any disclaimer, the term of this patent is extended or adjusted under 35 U.S.C. 154(b) by 451 days.

(21) Appl. No.: 12/404,473

(22) Filed: Mar. 16, 2009

(65) Prior Publication Data
US 2009/0242650 A1    Oct. 1, 2009

(30) Foreign Application Priority Data

Mar. 27, 2008 (JP) ................... 2008-083487
Sep. 2, 2008 (JP) ................... 2008-224862

(51) Int. Cl.
*G06K 19/06* (2006.01)
*G06K 7/10* (2006.01)
*G06K 7/14* (2006.01)

(52) U.S. Cl.
USPC .......................... 235/494; 235/454

(58) Field of Classification Search ............ 235/454, 235/494
See application file for complete search history.

(56) References Cited

U.S. PATENT DOCUMENTS

| | | | |
|---|---|---|---|
| 4,939,354 A | 7/1990 | Priddy et al. | |
| 5,726,435 A | 3/1998 | Hara et al. | |
| 6,279,830 B1 | 8/2001 | Ishibashi | |
| 7,032,823 B2 * | 4/2006 | Nojiri ...................... | 235/462.09 |
| 2004/0035935 A1 * | 2/2004 | Takahashi et al. ....... | 235/462.09 |
| 2007/0278303 A1 | 12/2007 | Cattrone | |
| 2007/0295814 A1 * | 12/2007 | Tanaka et al. ................ | 235/454 |
| 2009/0326836 A1 * | 12/2009 | Hovis et al. ..................... | 702/42 |
| 2010/0224687 A1 * | 9/2010 | Hiroyoshi ..................... | 235/494 |
| 2011/0049250 A1 * | 3/2011 | Hovis et al. ................... | 235/494 |

FOREIGN PATENT DOCUMENTS

| | | |
|---|---|---|
| EP | 1443452 | 8/2004 |
| GB | 2265237 | 3/1992 |
| JP | A-H02-012579 | 1/1990 |

(Continued)

OTHER PUBLICATIONS

Office Action dated Jun. 19, 2009 from the European Patent Office in the corresponding EP Application No. 09003769.8-2210.

(Continued)

*Primary Examiner* — Thien M Le
*Assistant Examiner* — Toan Ly
(74) *Attorney, Agent, or Firm* — Posz Law Group, PLC

(57) ABSTRACT

A two-dimensional code having a rectangular region is provided. In the rectangular region, there are a plurality of code blocks, a first specific pattern, and error-correction code blocks. Each code block is composed of a plurality of cells aggregated together and formed to have both a specified corner in the rectangular region and the plurality of code blocks arranged in the rectangular region. The specific pattern is used to specify the positions of the cells. The error-correction code blocks are contained in the code blocks and formed to correct an error. The error-correction code blocks are arranged contiguously to part of the borders of the rectangular region. The part of the borders is displaced from the first specific pattern. Compressed data code blocks are also arranged in the same way as the error-correction code blocks.

26 Claims, 16 Drawing Sheets

FOREIGN PATENT DOCUMENTS

| | | |
|---|---|---|
| JP | A-H07-254037 | 10/1995 |
| JP | A-H10-283446 | 10/1998 |
| JP | A-2000-148922 | 5/2000 |
| JP | A-2002-007979 | 1/2002 |
| JP | A-2004-234318 | 8/2004 |

OTHER PUBLICATIONS

Office Action dated Jul. 4, 2012 in corresponding JP Application No. 2008224862 (and English translation).

* cited by examiner

TWO-DIMENSIONAL CODE HAVING RECTANGULAR REGION PROVIDED WITH SPECIFIC PATTERNS FOR SPECIFICATION OF CELL POSITIONS AND DISTINCTION FROM BACKGROUND

CROSS-REFERENCE TO RELATED APPLICATION

This application is based on and claims the benefit of priorities from earlier Japanese Patent Application Nos. 2008-083487 and 2008-224862 filed Mar. 27, 2008 and Sep. 2, 2008, the descriptions of which are incorporated herein by reference.

BACKGROUND OF THE INVENTION

1. Technical Field of the Invention

The present invention relates to a two-dimensional code, and in particular, to a two-dimensional code having a rectangular region delineated by a plurality of cells and formed to have specific patterns for specifying the positions of cells in the rectangular region and distinguishing the code from the background.

2. Related Art

Various types of two-dimensional codes have been known and commercially used, which are composed of a plurality of cells arranged in a matrix form. In order to read the two-dimensional codes, a two-dimensional code reader is necessary. This reader usually captures a two-dimensional image data which contain a two-dimensional code, analyzes the image data to specify the area of the two-dimensional code (i.e., code area) in the image data, and decodes the image information of the specified code area.

As above, it is necessary to specify the area of a two-dimensional code in reading the two-dimensional code. Hence the two-dimensional code requires to be configured such that the code area can be specified quickly and accurately. With a view to meet this demand, there have been provided techniques disclosed by Japanese Patent Publication (Laid-open) No. 2-12579 and Japanese Patent Publication No. 2938338.

The technique disclosed by the former publication No. 2-12579 shows that an L-shaped specific pattern composed of continuous dark cells (square cells) arranged along two sides of a rectangle code area and a further specific pattern composed of dark cells and bright cells which are arranged alternately along the remaining two sides of the rectangular code area. In this way, since all the four sides of the rectangle code area are delimited by the specific patterns, it is easier for the reader to distinguish the code area from the background. However, in this case, it is required to use a large number of cells as the cells which should be assigned to the specific patterns, which are not data to be decoded and data for error correction. This leads to a reduction in the number of cells assigned to the data.

The latter reference No. 2938338 provides a technique, with which bright cells (white cells) and dark cells (black cells) are arranged in the data area, where the characteristics of the cells are changed under a given rule. Practically, a plurality of types of mask patterns (i.e., matrix patterns for changing the cell characteristics) are prepared in advance and, when producing a two-dimensional code, the respective mask patterns are superposed after data which has been arranged. After the superposition, an arrangement pattern showing the least continuity in the white cells and the black cells is adopted as an optimum arrangement pattern. This superposition technique makes it difficult for the bright cells and the dark cells to be continuously arranged at the borders of the code to the background, thus providing a higher distinction of the code area from the background. However, in the case of this technique, it is necessary to provide the code with information (mask pattern information) showing which type of mask pattern is adopted. Hence, it cannot help but to reduce the number of cells which can be assigned to both data to be decoded and data for error correction.

SUMMARY OF THE INVENTION

The present invention has been made in consideration of the foregoing situations, and it is an object of the present invention to provide a two-dimensional code that is able to distinguish the code area from the background more reliably and reduce the number of cells assigned to information other than data to be decoded and data for error correction, whereby the number of cells for such data can be increased as much as possible.

In the present invention, the two-dimensional code may be either a two-dimensional code having two types of cells consisting of bright cells and dark cells or a two-dimensional code having cells whose saturation, hue, and/or lightness differ from each other. The term "rectangular region" conceptually includes a square region and an oblong region.

In order to achieve the above object, the present invention provides, as its one aspect, a two-dimensional code having a rectangular region delineated from a background by a plurality of borders, comprising: a plurality of code blocks each composed of a plurality of cells aggregated together and formed to have i) a specified (desired or predetermined) corner in the rectangular region and ii) the plurality of code blocks arranged in the rectangular region; a first specific pattern used to specify the positions of the cells; and error-correction code blocks contained in the code blocks, formed to correct an error, and arranged contiguously to part of the borders of the rectangular region, the part of the borders being apart shifted the first specific pattern.

It is preferred that one or more of the error-correction code blocks are arranged along each of the borders of the rectangular region.

As another aspect, the present invention provides a two-dimensional code having a rectangular region delineated from a background by a plurality of borders, comprising: a plurality of code blocks each composed of a plurality of cells aggregated together and formed to have i) a specified (desired or predetermined) corner in the rectangular region and ii) the plurality of code blocks arranged in the rectangular region; a first specific pattern used to specify the positions of the cells; and compressed-data code blocks contained in the code blocks and arranged contiguously to part of the borders of the rectangular region, the part of the borders being displaced from the first specific pattern, compressed data being stored in the compressed-data code blocks.

It is preferred that one or more of the compressed-data code blocks are arranged along each of the borders of the rectangular region.

In the above two aspects, it is also preferred that the borders of the rectangular region includes a first border along which the first specific pattern is arranged and one or more of the error-correction code blocks are arranged along the first border.

DETAILED DESCRIPTION OF THE PREFERRED EMBODIMENTS

Referring to the accompanying drawings, a variety of embodiments of the present invention focusing on a two-dimensional code (hereinafter also referred to as "2D code(s)") will now be described.

It should be appreciated that, throughout the present specification, when a term "rectangular shape, outline or region" is used, the term implies a shape, outline or region of a four-sided polygon having four right angles, with opposite sides having the same length or with all of the sides having the same length. Also, throughout the present specification, when a term "square shape, outline or region" is used, the term implies a shape, outline or region of four-sided polygon having four right angles, with all of the sides having the same length. Further, throughout the present specification, when a term "oblong shape, outline or region" is used, the term particularly implies only a "rectangular shape, outline or region" where one pair of opposite sides has a length different from that of the other pair of opposite sides.

First Embodiment

Figure 1:
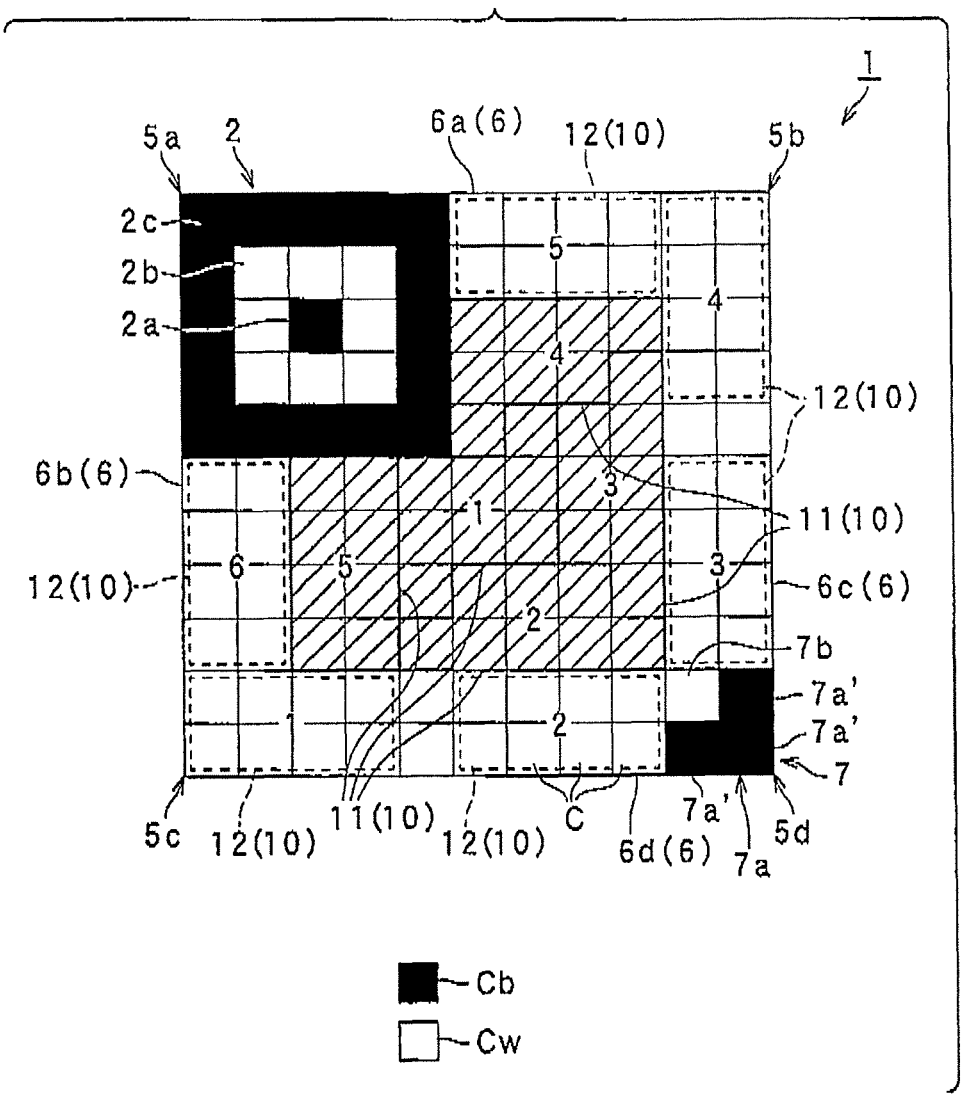
FIG. 1 is an illustration outlining a two-dimensional code according to a first embodiment of the present invention.
Figure 2:
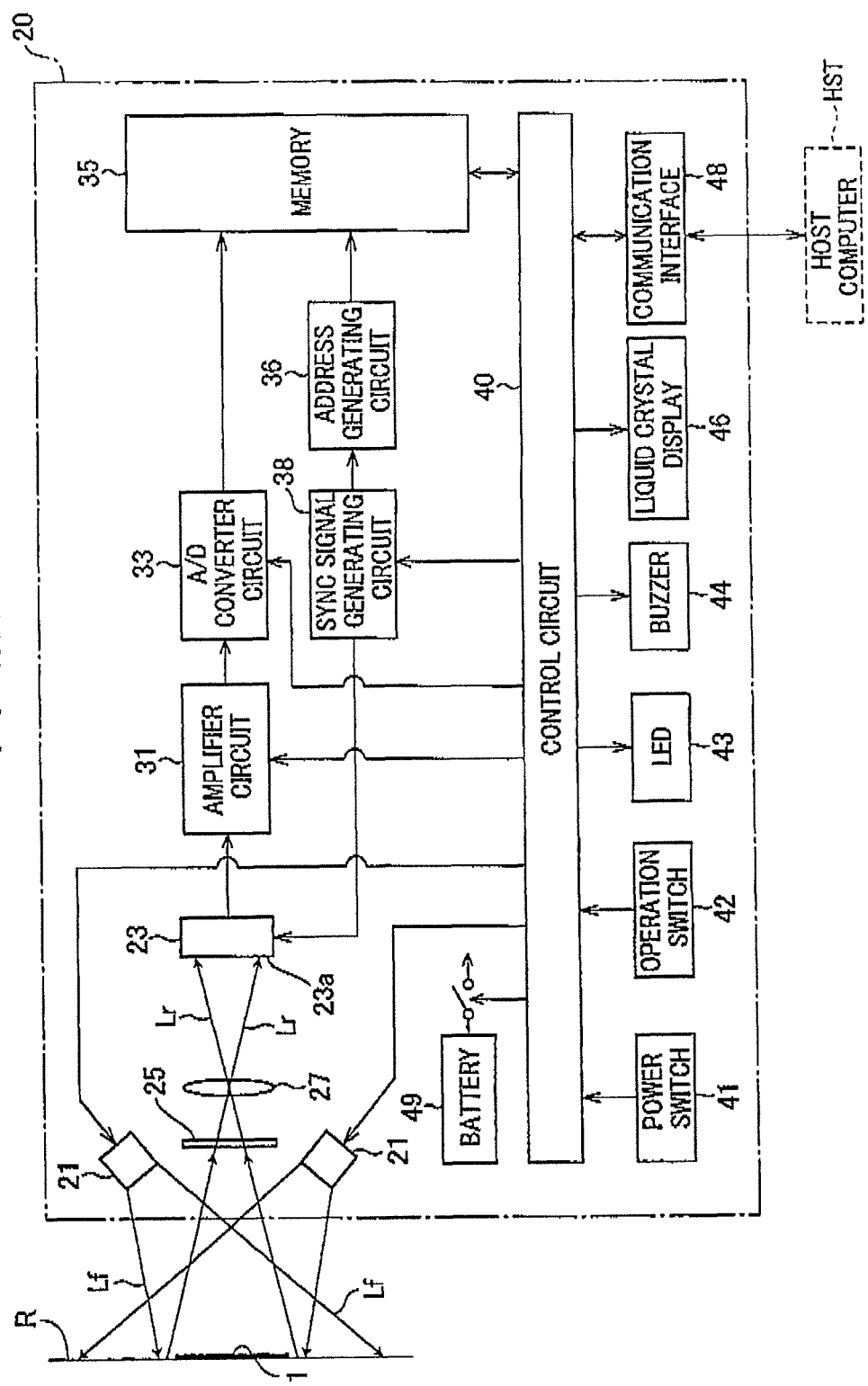
FIG. 2 is a block diagram outlining an optical information reader that reads out information from the two-dimensional code.
Figure 3:
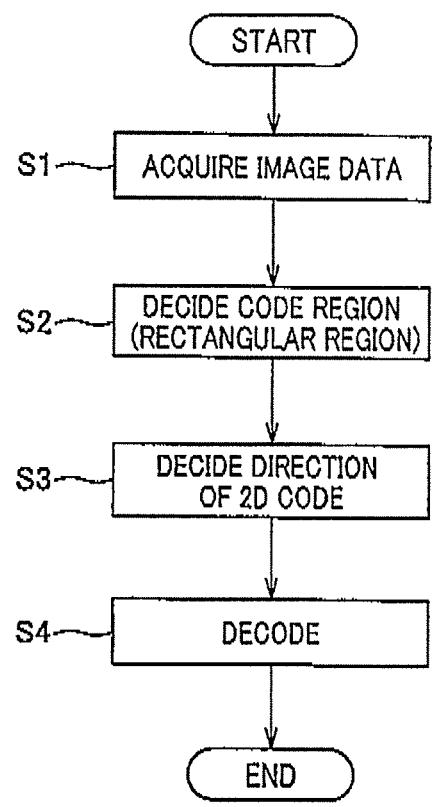
FIG. 3 is a flowchart exemplifying a reading process for reading information from the two-dimensional code.

Referring to FIGS. 1-3, a first embodiment of a two-dimensional code according to the present embodiment will now be described.

FIG. 1 conceptually illustrates the two-dimensional code according to the first embodiment, in which the positions of error-correction code blocks 12, which will be described later, are conceptually shown by dashed lines and the positions of data code blocks 11 are conceptually shown by solid-line areas with hatching therein. In FIG. 1, practical cell structures of respective code blocks 10 are omitted from being detailed.

As shown in FIG. 1, the two-dimensional code 1 (hereinafter referred to as the 2D code 1), which is structurally composed of a plurality of cells C arranged (mapped, drawn, represented, depicted, or present) in a matrix, comprises a plurality of code blocks 10, a first specific pattern 2, and an end pattern 7 from the functional viewpoint. Practically, the 2D code 1 is composed of an aggregation of cells arranged in a matrix by aggregating the cells into a square form. In the example shown in FIG. 1, the total number of cells is 11 cells in height (or width)×11 cells in width (or height), which are the same in number in the high and width, which are arranged to form a rectangular area, precisely, a square area. That is, the outer edge of this code 1 is formed into a square. In FIG. 1, the reference numerals of the cells C are partly numbered for the sake of simplifying the illustration.

The arranged cells produce the borders (boundaries or peripheries) of the 2D code 1 by their outer edges, so that the code 1 can be distinguished from the background using the borders. How to arrange the cells depends on design, which means that, in effect, the borders are positionally decided on how to arrange the respective cells.

The 2D code 1 can be composed by using a plurality of types of cells whose color, density, or luminance is different type by type from each other. In the following, two types of cells 10, which are different in colors from each other (that is, black cells Cb and white cells Cw), are used for the 2D code 1. Therefore, this code 1 has a two-color configuration.

Each code block 10, which is also an aggregation of a plurality of cells C, functions as a data code block 11 or an error-correction code block 12. These code blocks 11 and 12 are produced as non-masked blocks with no masking process, so that these code blocks 11 and 12 can be decoded without a de-masking process. In the example shown in FIG. 1, the code blocks 10 include regular-matrix code blocks (2×4 cells or 4×2 cell) and irregular-matrix code blocks in a mixed manner. However, it should be noted that the code blocks 10 shown in FIG. 1 is a mere example and can be modified into various shapes of matrices (i.e., aggregated cells).

The date code blocks 11 are blocks, each of which expresses encoded data using a plurality of cells. The encoded data, i.e., data code words, are produced by encoding data to be decoded. In the example shown in FIG. 1, 8 cells are aggregated as one block 11. The cells that compose each data code block 11 are also composed of either black cells or while cells (i.e., two types of cells).

Each data code block 11 has a cell array corresponding to encoded data to be decoded (i.e., data code word). In the present embodiment, the colors of the cells are assigned to numeric values. For example, data "0" is assigned to the white cells and data "1" is assigned to the black cells.

In the 2D code 1 in FIG. 1, the data code blocks 11 are arranged in a central part of the square area, which are surrounded by error-correction code blocks 12 which will be described later. Practically, five data code blocks 11 are arranged in the central part of the code 1, while six error-correction code blocks 12 are arranged around the five data code blocks 11 to form a rectangular and annular block area therearound.

The respective error-correction code blocks 12 are composed of error-correction code words to correct errors of the respective data code blocks 11. The error-correction code words, which compose the error-correction code block 12, are produced based on the encoded data (data code word) that composes the data code blocks 11. This production can be performed by using, for example, a known Reed-Solomon error-correction process.

In the present embodiment, a production method regulated by JISX0510: 2004 (JISX0510: 2004 8.5 error correction) is used to produce the error-correction code words from the data code words. In using this production method, data code words of each data code block 11 are expressed by binary digits, and then divided by a polynomial expression g(x) used for error correction detection and correction (JISX0510:2004 appendix A), so that a residual resulting from the division is given as error-correction code words. The produced error-correction code words are converged into a block expressed by a plurality of cells, which block is thus provided as an error-correction code block 12. Instead of the production method based on JISX0510, the error-correction code word can be produced with the use of other various known techniques.

The first specific pattern 2 is arranged at a specified corner 5a selected from the four corners 5a-5d of the rectangle area provided by the 2D code 1. In FIG. 1, the first specific pattern 2 has a rectangular (precisely, square) outer edge and is arranged at the specified corner 5a so that two outer sides of the first specific pattern 2 are along the two sides extended from the corner 5a. This first specific pattern 2 functions as a member to specify the positions of the respective cells C in the rectangular area. To be specific, this first specific pattern 2 is used to specify not only the position of the specified corner 5a in image data obtained by an optical information reader (described later) but also the orientation of a 2D code 1 contained in the read image data. In the present embodiment, the "specific pattern" is made to be a given pattern independent of data (i.e., data to be decoded) contained in a 2D code 1.

The first specific pattern 2 has one cell having a first color (black cell 2a) arranged at the center thereof and a plurality of second cells (white cells 2b) arranged to enclose the first color cell (black cell 2a) in a square annular form. Further, a plurality of first cells (black cells 2c) are arranged, as an outermost cell group, to enclose the square-and-annular formed second cells (white cells 2b). The outermost cell group has a square shape (outer shape), so that the first specific pattern 2 has a square (or rectangular) shape as a whole.

Further, at the diagonal position to the first specific pattern 2 in the code area, an end pattern 7 indicating the corner 5d of the code area is arranged. This end pattern 7 has an L-shaped area 7a in which a plurality of cells are continuously arranged to form an L shape. These cells are the same type in color, density and luminescence. In the example in FIG. 1, three cells whose types are the same in the saturation, hue and lightness are used to form the L-shaped area 7a having an outer edge bent perpendicularly. This outer perpendicular edge is located along the corner 5d. Hence, by detecting this outer perpendicular edge of the L-shaped area 7a in the reading process (which will be detailed later), the diagonal position 5d of the rectangular area can be specified.

Among the plurality of code blocks 10 arranged in the rectangular area, part of the plurality of code blocks 10 is produced to function as a border-contiguous block. This border-contiguous block is located along the borders 6 of the rectangular area other than the border contiguous (or adjoining) to the first specific pattern 2 and includes at least one cell whose color, density or luminescence differs from the background. In the example in FIG. 1, six error correction blocks 12 are arranged to function as the border-contiguous block and are composed of cells which are different in color from the background (in this example, white). Thus the different-color cells are arranged along the borders 6 other than the position of the first specific pattern 2.

In the example shown in FIG. 1, the error-correction code blocks 12, which correspond to contiguous-to-border blocks, are arranged along the respective borders 6 of the code area such that at least one error-correction code block 12 is arranged along each border 6. Specifically, the two error-correction code blocks 12 are arranged along the two first borders 6a and 6b along which the first specific pattern 2 are arranged. In addition, plural error-correction code blocks 12 are respectively arranged along the two second borders 6c and 6d along which the first specific pattern 2 is not arranged. That is, along one border 6a of the two first borders 6a and 6b, two error-correction code blocks 12 (the forth and fifth ones) are arranged, while along the other first border 6b, two error-correction code blocks 12 (the first and sixth borders) are arranged. Of the second borders 6c and 6d, two error-correction code blocks 12 (the third and forth ones) are arranged along one border 6c, while two error-correction code blocks 12 (the first and second ones) are arranged along the other second border 6d.

Along any of the borders 6, half of the cells composing each of the error-correction code blocks 12 are arranged. In other words, as to the first border 6a, half the cells that compose the fifth error-correction code block 12 (4×2 matrices) are arranged along the first border 6a. That is, the longer-directional contiguous cells of this code block 12 are arranged along the first border 6a. As to the first border 6b, half the cells that compose the sixth error-correction code block 12 (2×4 matrices) are arranged along the first border 6b. That is, the longer-directional contiguous cells of this code block 12 are arranged along the first border 6b. In addition, as to the second border 6c, half the cells that compose each of the third and fourth error-correction code blocks 12 (each being composed of 2×4 matrices) are arranged along the second border 6c. That is, the longer-directional contiguous cells of each of these code blocks 12 are arranged along the second border 6c. Similarly, as to the second border 6d, half the cells that compose each of the first and second error-correction code blocks 12 (each being composed of 4×2 matrices) are arranged along the second border 6d. That is, the longer-directional contiguous cells of each of these code blocks 12 are arranged along the second border 6d.

The code area of the 2D code 1 is produced as a square area composed of L×L matrices (L: odd number), which is L cells on a side. In the example in FIG. 1, L=11, so that there is provided a square code of matrices of 11×11. The first specific pattern 2 is formed to have a square outer edge by arranging or arranging M (odd number: M<L)-piece cells on a side such that M×M matrices are composed. In the example in FIG. 1, M=5, so that the first specific pattern 2 is composed of 5×5 cells. In most cases, the code blocks 10 are formed into rectangular blocks of A×B matrices where an even-number of cells A are arranged on one side and an even-number of cells B are arranged on the other side. In the example in FIG. 1, the data code blocks 11 and the error-correction code blocks 12 are formed into not only rectangular blocks of 2×4 matrices or 4×2 matrices but also irregularly-shaped blocks other than rectangular blocks.

Further, the example shown in FIG. 1 has some vacant cells, which are respectively arranged between the first and second error-correction code blocks 12, between the third and fourth error-correction code blocks 12, and among the end pattern 7 and the third and fourth error-correction code blocks 12. These vacant cells have no application, but this is not a comprehensive example. The code blocks 10 may be modified in their arrangements so that such vacant cells are used as part of the code blocks 10 or are used as any other specific patterns. Alternatively, residual blocks which are not used as data for the code blocks 10 may be assigned to those vacant cells.

How to produce the 2D code 1 according to the present embodiment will now be outlined.

This 2D code 1 can be produced by an information processor (such as a computer) provided with necessary components such as a CPU (central processing unit) and memories. When producing a 2D code 1, data values (i.e., data to be decoded) for the code 1 are first acquired, and error-correction codes for the data values are produced. Then data code blocks expressing the data values and error-correction code blocks expressing the error-correction codes are produced. Then the respective data code blocks and the respective error-correction code blocks are arranged in turn. In this arrangement process, the error-correction code blocks are arranged in ascending sequence such that the last error-correction code block (in the example, the sixth error-correction code block 12) is first arranged and the remaining error-correction code blocks are arranged in the ascending sequence. When completing the arrangement of the head block of the error-correction code blocks 12, the data code blocks 11 are also arranged in ascending order. The last one of the data code blocks 11 (in the example in FIG. 1, the fifth data code block 11) is first arranged and the remaining data code blocks are arranged in turn in the ascending order.

More specifically, a given point along the borders 6 of this 2D code 1 is defined as a start point for the arranging, and from the start point, the error-correction code blocks 12 are arranged sequentially from the last correcting code block so as to be along the borders 6. That is, the last error-correction code block 12 (i.e., the sixth error-correction code block 12) is arranged at a position contiguous to the first specific pattern 2 and along the first border 6*b*. After this, the fifth, fourth, third, second and first error-correction code blocks 12 are arranged sequentially in the clockwise direction along the borders 6. When the first (head) error-correction code block 12 has been arranged, the last data code block 11 (i.e., the fifth data code block 11) is first arranged at a given point contiguous to the first-arranged error-correction code block 12. Then the fourth, third, second and first code blocks 11 are arranged in turn in the clockwise direction along the outer code blocks 10 (that is, the error-correction code blocks 12) already arranged. In this way, the error-correction code blocks 12 can be arranged all over along the borders 6, and the data code blocks 11 can be arranged all over along the already arranged code blocks 12.

How to read the 2D code 1 will now be exemplified.

In the present embodiment, the 2D code 1 can be read out by an optical information reader 20 exemplified in FIG. 2. This reader 20 is primarily composed of an optical system including a lighting source 21, a light sensor 23, a filter 25, and an imaging lens 27, a microcomputer system including a memory 35, a control circuit 40, an operation switch 42, and a liquid crystal display 46, and a power system including a power switch 41 and a battery 49.

Of the optical system, the lighting sources 21 function as sources each emitting illuminating light Lf and each of the light sources 21 is provided with an LED (light-emitting diode) and a lens system which is arranged on a light emission side of the LED. The lens system includes a diffusing lens and a collecting lens. In the present embodiment, the lighting sources 21 are in front of the light sensor 23, but distinguished from each other in the radial direction thereof, and emit the illumination light Lf toward an object to be read R through a reading opening (not shown) of the housing. The object R is for example a packaging container, a packing paper or a label, which functions as display media. The code 1 can be formed on the object R by appropriate measures such as printing and direct marking.

The light sensor 23 is formed to receive light Lr reflected from the object R (and the 2D code 1) by having the light Lf emitted toward the object R. In the present embodiment, the light sensor 23 is composed of an area sensor with light-receiving elements two-dimensionally arranged. Such elements are composed of C-MOS or CCD, which is provided as a solid-state image sensing device. The light sensor 23 is mounted on a printed circuit board (not shown) and has a light receiving surface to receive the incident light coming via the imaging lens 27. The filter 25 is an optical low-pass filter through which only light having a wavelength equal to or less than that of the reflected light Lr is allowed to pass therethrough. Hence, unnecessary light, whose wavelength is higher than that of the reflected light Lr, is prevented from entering the light sensor 23. The imaging lens 27 is composed of, for example, a lens tube and a plurality of collecting lenses accommodated in this lens tube and functions as an imaging optical system that images on the light receiving surface 23*a* of the light sensor 23 by collecting of the light incoming from the outside through the reading opening.

The microcomputer system will now be described. This system includes an amplifier circuit 31, an A/D converter circuit 33, a memory 35, an address generating circuit 36, a sync signal generating circuit 38, a control circuit 40, an operation switch 42, an LED 43, a buzzer 44, a liquid crystal display 46, and a communication interface 48. In this system, the control circuit 40 and the memory 35 play a significant part of the microcomputer (serving as an information processor). This microcomputer system performs software processing on image signals optically acquired from the 2D code 1. The control circuit 40 also controls the whole operations of the optical information reader 20.

The analogue image signal outputted from the light sensor 23 is inputted to the amplifier circuit 31 and amplified at a given gain therein. The amplified image signals are given to the A/D converter circuit 33 to be converted into digital image signal. The digitized image signals, that is, image data (or image information) are stored in an image-data storing area of the memory 35. The sync signal generating circuit 38 is formed to generate a synchronization signal to be sent to the light sensor 23 and the address generating circuit 36. This circuit 36 uses the synchronization signal to generate an address for storing the image data in the memory 35.

The memory 35 is composed of semiconductor memory devices such as RAMs (DRAM and SRAM) or ROM (EPROM and EEPROM). In the RAMs of the memory 35, there are provided the foregoing image-data storing area, a work area, and a table for reading conditions. The work area is used by the control circuit 40 to perform various types of calculation necessary for processes assigned to the control circuit 40. The ROM is used to previously store given programs for performing processes such as a later-described reading process as well as system programs for controlling the operations of the respective hardware components including the lighting source 21 and the light sensor 23.

The control circuit 40 includes a microcomputer equipped with a CPU, system buses, and an input/output interface. In association with the memory 35, the control circuit 40 functions as an information processor. To provide this information processor, the control circuit 40 is electrically connected to various border devices via the input/output interface incorporated in the circuit 40. In the present embodiment, the border devices include, as stated, the power switch 41, operation switch 42, LED 43, buzzer 44, liquid crystal display 46, and communication interface 48. To the communication interface 48, such peripheral devices as a host computer HST, which is a host system for the optical information reader 20, can communicate.

Further, in the power system, the battery 49 supplies drive voltage to the foregoing various devices and circuits. The drive voltage is subjected to on/off control commanded from the power switch 41 via the control circuit 40, so that supplying the drive voltage is allowed or not allowed selectively.

In this optical information reader 20, the reading process is performed as follows.

When an operator performs given operations (including an on-operation at the operation switch 42), a reading process shown in FIG. 3 starts. Practically, an image data acquisition process is first carried out (step S1). In this process, the control circuit 4 outputs, to the lighting source 21, a signal for realizing light emission in response to the synchronization signal, and the lighting source 21, which has received the signal, makes the LED emit light so that illuminating light Lf is radiated toward the 2D code 1. The illuminating light Lf is reflected by the 2D code 1 so as to produce the reflected light Lf, which enters the imaging lens 27 via the reading opening and the filter 25. As a result, the imaging lens 27 produces an image of the 2D code 1, that is, a code image, on the light receiving surface 23a. The light-receiving elements of the light sensor 23 are thus exposed to the light, whereby these elements output electrical signals depending on the image of the 2D code 1. As stated, these signals are processed into image data of the 2D code 1, and stored in the memory 35.

The image data stored in the memory 35 are then used to decide the code region (rectangular region) of the 2D code 1 (step S2). In this step, the respective borders 6 which define the code region are decided. How to decide the borders 6 is preferably provided by, for example, Japanese Patent Laid-open Publication No. 10-198754 or Japanese Patent Laid-open Publication No. 2000-353210 which extracts a code region by counting the number of points at which lightness or contrast changes. The latter technique is provided on the assumption that an object is a two-color 2D code and changes in lightness in the code are detected. This latter technique is not limited to such a use, but may be applied to a multiple-color 2D code basically in the similar manner. That is, while scanning along each scanning line in the image data, changes in pixel values, which may change from a given value showing a certain color to other values showing other colors, are counted. In addition, since various other techniques to distinguish different colors from one other have been known, such techniques may also be used in step S2. In short, as long as cells which differ in color from the background are arranged in and along portions composing the borders of the rectangular region, the various known techniques can be used to decide the different-color cells, which are then connected. The outer edges of the connected cells depict the borders of the rectangular region.

In particular, at the corners 5a and 5d, the first and second specific patterns 2 and 7 are arranged which are composed of cells whose colors are different from that of the background. The various known image processing techniques can be used to decide (specify) the positions of the corners 5a and 5d. In the area other than the first and second specific patterns 2 and 7, the error-correction code blocks 12 are arranged contiguous to and along the respective borders 6, so that the various known image processing techniques can be used to specify the borders 6 of the remaining area.

In the reading process, the specified code region and the first specific pattern 2 are used to decide the orientation of this 2D code 1 (step S3). Practically, it is decided that the first specific pattern 2 is located at which corner of the specified rectangular region. The direction (i.e., attitude) of the 2D code 1 in the image data can be decided depending on the positions of the first specific pattern 2.

Further, based on the code region whose border positions and directions have been specified, the image data is decoded (step S4). In the present embodiment, the types of codes are previously stored in the reader 20. Hence, depending on the size of the rectangular region and the configurations of both the first specific pattern 2 and the end pattern 7, the code type is decided, the decided type of code is used to decode the data of the respective data code blocks 11, and the error-correction code blocks 12 are used to error-correct the decoded data.

The 2D code 1 according to the present embodiment has various advantages which are as follows.

The first specific pattern 2 is arranged at the specified corner 5a of the rectangular region of the 2D code 1. Hence, in reading out image data from the 2D code 1, it is easier to decide the direction of the whole 2D code 1 and the position of a part of the rectangular region in a more reliable manner. In addition, the error-correction code blocks 12, which are the contiguous-to-border blocks, are arranged along the remaining borders of the area contiguous to the borders along which the first specific pattern 2 is arranged. Each of the error-correction code blocks 12 includes one or more cells (heterochromatic cells) which are different in saturation, hue, or lightness from the background of the code. Hence, as to the borders 6 along which the first specific pattern 2 is not arranged, it is easier to decide those borders 6 using the heterochromatic cells contained in each block 12 in a more reliable manner. Further, part of the code blocks 10 can also be used as the contiguous-to-border blocks which allow borders 6 to be decided. Thus, compared to a technique of using specific patterns (with no data to be decoded and with no data for error correction) to decide all the borders 6, the number of cells assigned to information other than the data (to be decoded and to be used for error correction) can be reduced. The number of cells assigned to the data can therefore be increased efficiently.

In the present embodiment, the contiguous-to-border blocks are given as the error-correction code blocks 12. From its characteristics viewpoint, it is extremely unlikely that the error-correction code blocks 12 have cells which are long continuously arranged and are the same in saturation, hue, and/or lightness as the background. For this reason, the error code correcting blocks 12 can also be used as blocks to decide the borders 6. In consequence, using the data absolutely necessary for the error correction, the borders 6 can be decided or specified reliably, which also reduces the number of cells assigned to information other than data.

Particularly, half the cells of each of the error-correction code blocks 12 are always arranged contiguously to any one of the borders 6. It is thus possible that the probability that all the cells contiguous each border 6 are the same in color as the background is almost zero, resulting in that the cells which are different in color from the background can be arranged contiguously to the borders 6 in an easier manner.

In addition, in the embodiment, at least one of the error-correction code blocks 12 is arranged contiguous to each of the borders 6 that forms the rectangular region. That is, the areas for the code blocks can be secured at the positions contiguous to the respective borders 6, whereby the code block areas can be expanded effectively. In reading the 2D code 1 as image data, the respective borders 6 can be decided reliably using the error-correction code blocks 12, that is, the contiguous-to-border blocks, arranged contiguously to the respective borders 6. This will allow the rectangular region to be specified more reliably.

Moreover, at least one error-correction code block 12 is arranged contiguously to the first borders 6a and 6b to both of which the first specific pattern 2 is arranged contiguously. Thus, the first borders 6a and 6b can be detected reliably using the first specific pattern 2 and the blocks 12 contiguous thereto.

The end pattern 7 is arranged at the corner 5d of the rectangular region, which corner 5d is positioned diagonally to the first specific pattern 2. Hence, the specified corner 5a can be distinguished reliably from the background by the first specific pattern 2, while the diagonally positioned corner 5d can be distinguished reliably from the background by the end pattern 7. In this case, the end pattern 7 can compensate for deciding the second borders 6c and 6d to both of which the first specific pattern 2 is not arranged contiguously, whereby the rectangular region can be positionally decided, as a whole, in a stable and reliable manner.

In addition, the end pattern 7 has the L-shaped area 7a composed of a plurality of cells arranged continuously and contiguously to each other, which cells are the same in saturation, hue, and lightness. The outer edges of the L-shaped area 7a provide the corner 5d positioned diagonally to the specified corner 5a. Thus it becomes easier to decide the corner 5d diagonal to the specified corner 5a and, during reading the 2D code, deciding the L-shaped area 7a contributes to an easier recognition of the second borders 6c and 6d that compose the corner 5d. By using the end pattern 7, the second borders 6c and 6d can be decided (specified) in a reliable and stable fashion, though those borders 6c and 6d are not arranged along the first specific pattern.

Second Embodiment

Figure 4:
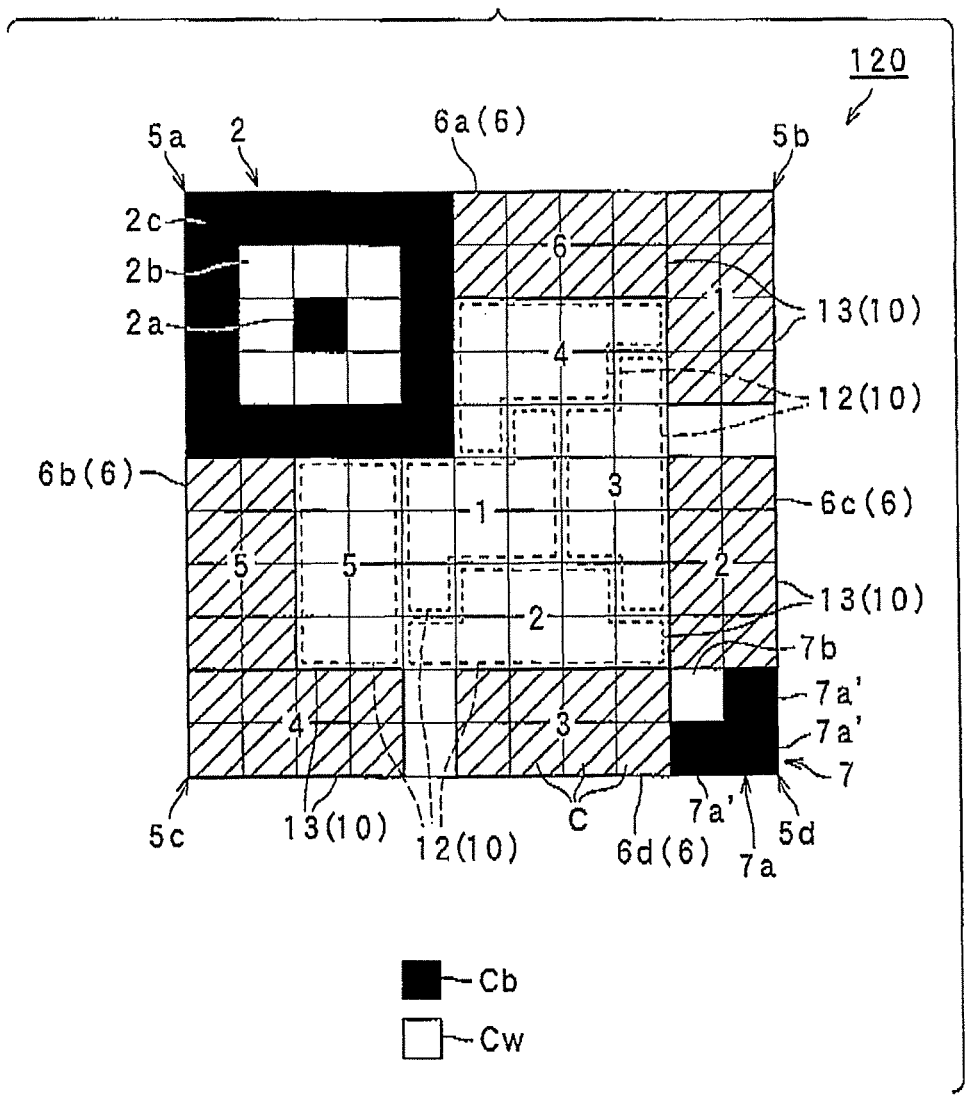
FIG. 4 is an illustration outlining a two-dimensional code according to a second embodiment of the present invention.

Referring to FIG. 4, a second embodiment of the two-dimensional (2D) code according to the present invention will now be described. In the second embodiment and other embodiments following thereafter, the same or identical components as or to those in the first embodiment will be given the same reference numbers for the sake of a simplified or omitted explanation.

FIG. 4 conceptually illustrates a 2D code 120 adopted by the second embodiment. In FIG. 4, the positions of the error-correction code blocks 12 are conceptually illustrated by dashed lines, while the positions of compressed-data code blocks 13, which will be described later, are conceptually illustrated by solid lines and hatching the areas enclosed by the solid lines. In addition, FIG. 4 is omitted from detailing the cell configurations of the respective code blocks 10.

The 2D code 120 of the present embodiment is the same in construction as the 2D code shown in FIG. 1 except for the configurations and arrangement manner of the code blocks 10.

The 2D code 120 has a code region produced into a square region which can be generalized as a rectangular region (, so that the code region is frequently referred as the rectangular region). That is, the code region has a square matrix whose one side is composed of an odd-number L of cells C arranged linearly and contiguously to each other. Practically, similarly to that shown in FIG. 1, the square matrix is composed of cells of 11×11 pieces. This 2D code 120 also has the borders 6 which are the same in shape and length as those shown in FIG. 1 and the first specific pattern 2 and the end pattern 7 which are also the same in configuration as those shown in FIG. 1. Each cell C of this 2D code 120 is composed of either one of two types of cells, i.e., black cell and white cell, providing the code 120 with a two-color arrangement configuration.

The code blocks 10 of the 2D code 120 are composed of the error-correction code blocks 12 described already and compressed-data code blocks 13 in which compressed data are stored. As to the cell configurations in FIG. 4, the error-correction code blocks 12 are collected and arranged in a central part of the code 120, and enclosed by the compressed-data code blocks 13. Practically, the five error-correction code blocks 12 are arranged, and enclosed by the six compressed-data code blocks 13 which are arranged in an annular and square form. These compressed-data code blocks 13 and error-correction code blocks 12 are non-masked blocks with no masking process, so that these code blocks 13 and 12 can be decoded without a de-masking process.

The compressed-data code blocks 13 are blocks each expressed by a plurality of cells describing a compressed encoded data (i.e., data code word) produced by encoding and compressing a data to be decoded. In the example in FIG. 4, eight cells (i.e., plural) cells are collected into one block. Each of the compressed-data code blocks 13 adopts, as its constituents, the cells which are selected, cell by cell, from previously given plural types of cells (in FIG. 4, two types of cells).

The compressed data for the code blocks 13 are produced by compressing data to be coded using known compression techniques. An algorithm for such compression techniques is a Run-Length encoding technique or a Huffman encoding technique, for example, and any algorithm may be used. For example, assume that data to be decoded is for example "0000000000001111" and Run Length Encoding is applied to this data. In this example, there are twelve "0" digits (12=1100 in binary) and four "1" digits (4=0100 in binary), being expressed as "0110010100" in which "0", "1100", "1" and "0100" are concatenated. The sequence of the digits can thus be shortened, whereby it is possible to reduce the probability of long runs of cells of background color occurring within the compressed-data code blocks 13.

In the present embodiment, the compressed-data code blocks 13, which compose contiguous-to-border blocks, are produced to arrange one or more cells (heterochromatic cells) at one or more positions contiguous to the respective borders 6. Such heterochromatic cells are different in saturation, hue, or lightness from the background.

In the example in FIG. 4, half the cells of each of one or more cells of the compressed-data code blocks 13 are along (i.e., contiguous to) each of the borders 6. Hence, when the compressed-data code blocks 13 are given some information, the probability that all the cells arranged along the borders 6 are the same in color as that of the background can be almost zero, making it possible to reliably arrange heterochromatic cells contiguously to the borders 6.

Instead of the compressed-data code blocks 13 whose data are all compressed, these code blocks 13 may include data code blocks whose cells are given non-compressed data.

In the present embodiment, it is thus possible to provide the same or identical operations and advantages as or to those described in the first embodiment. That is, the code region can be distinguished from the background in a more reliable manner. At the same time, the number of cells assigned to data other than data to be coded can be reduced as much as possible, thereby increasing the number of cells for the data to be coded.

In addition to the above, the contiguous-to-border blocks are composed of the compressed-data code blocks 13. Using these blocks 13 in common as blocks for arranging the data to be coded and delineating the borders 6 allows the data size to be smaller as much as possible and the borders 6 to be decided reliably. The number of cells assigned to information other than the data can thus be lowered.

Third Embodiment

Figure 5:
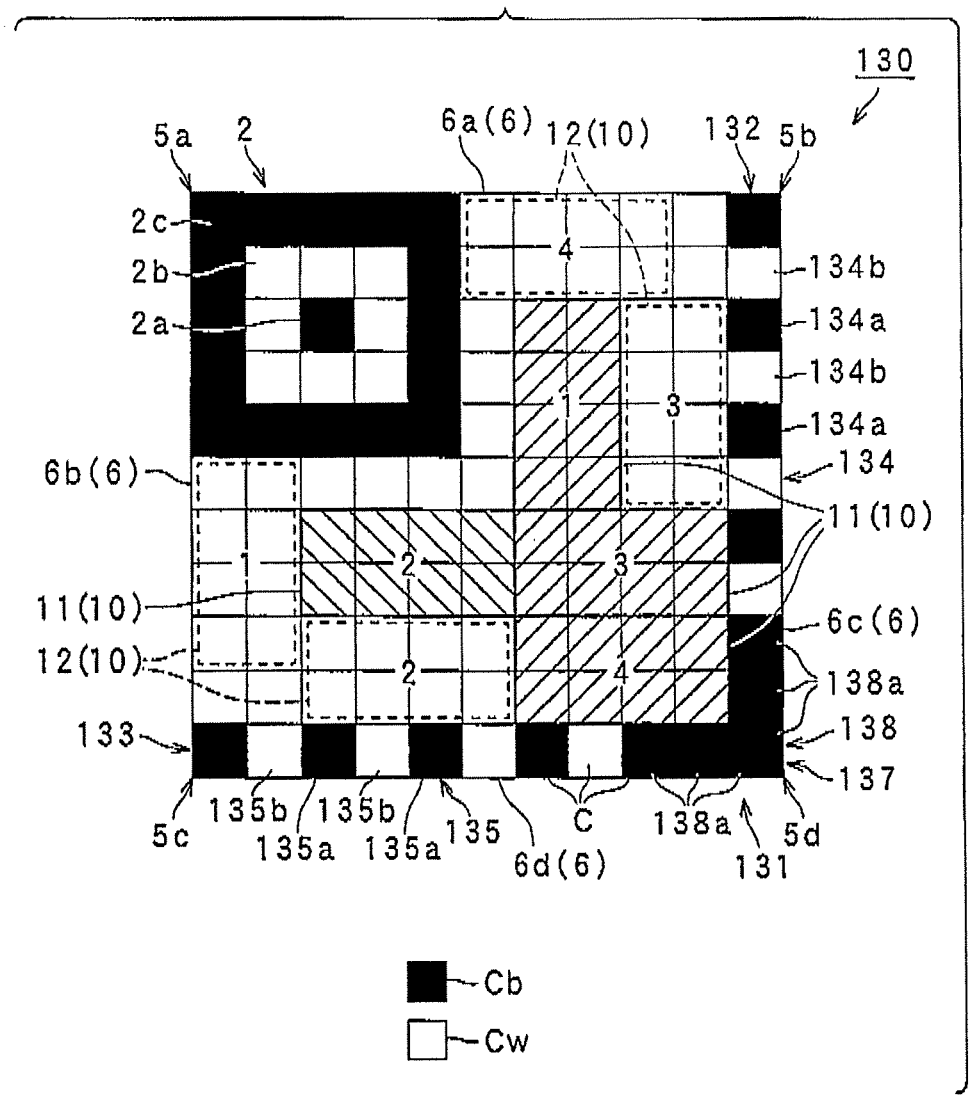
FIG. 5 is an illustration outlining a two-dimensional code according to a third embodiment of the present invention.

Referring to FIG. 5, a third embodiment will now be described.

FIG. 5 conceptually illustrates a 2D code 130 adopted by the third embodiment. In FIG. 5, the positions of the error-correction code blocks 12 are conceptually illustrated by dashed lines, while the positions of the data code blocks 11 are conceptually illustrated by solid lines and hatching the areas enclosed by the solid lines. In addition, FIG. 5 is omitted from detailing the cell configurations of the respective code blocks 10.

The 2D code 130 differs from that shown in FIG. 1 in that the code 130 has a second specific pattern 131 later described as well as error-correcting blocks 12 and data code blocks 11, which blocks 12 and 13 are shaped and arranged differently from those shown in FIG. 1. The remaining features, that is, the configuration of the first specific pattern 2, the entire matrix configuration of the code 130, the shape and length of the borders 6, and the positions and shapes of the corners 5a-5d are the same as those described in FIG. 1.

The 2D code 130 has a code region with a 11×11 square matrix, which is the same as the code region of the 2D code 120 described in the second embodiment. Each of the cells C of this 2D code 130 is also a black cell or a white cell.

In the 2D code 130, as shown in FIG. 5, a second specific pattern 131 is arranged along (contiguously to) the second borders 6c and 6d to which the first specific pattern 2 is not adjunct. The second specific pattern 131 is composed of a plurality of types of cells which are different in saturation, hue, or lightness, and in FIG. 5, composed of two types of cells consisting of white cells or black cells. Furthermore, the second specific pattern 131 includes a specific pattern 132 arranged along one of the second borders, 6c, and a further specific pattern 133 arranged along the other second border 6d. Both specific patterns 132 and 133 are characteristic of being along the entire lengths of the two second borders 6c and 6d, respectively, and being arranged to form an L-shape as a whole.

The one specific pattern 132 is composed of a one-end-side pattern 134 given by a plurality of colored cells arranged in a predetermined order and part of an end pattern 137. Specifically, the one-end-side pattern 134 is made up of given color cells (e.g., black cells 134a) and given color cells, which are different therefrom, (e.g., white cells 134b), which two types of color cells are arranged alternately. The end pattern 137 is composed of a plurality of cells whose colors are the same with each other (e.g., as shown in FIG. 5, five black cells 138a) and which are arranged to produce an L-shaped area 138. This end pattern 137 thus serves as a making indicating the corner 5d which faces diagonally to the specified corner 5a. This specific pattern 132 thus has two ends; one end has an outer edge composing one end of the first border 6a located at the corner 5b, while the other end is connected to the specific pattern 133, with part of the specific pattern 132 providing part of the end pattern 137. The entire outer edge of the specific pattern 132 provides the second border 6c.

The other specific pattern 133, which is also produced similarly to the above, includes a one-end-side pattern 135 and part of the end pattern 137. The one-end-side pattern 135 is composed of black cells 135a and white cells 136, which are arranged alternately to each other. This specific pattern 133 also has both ends; one end has an outer edge composing one end of the first border 6b located at the corner 5c, while the other end is connected to the specific pattern 132, with part of the specific pattern 133 providing part of the end pattern 137. The entire outer edge of the specific pattern 133 provides the second border 6d.

In this way, the second specific pattern 131 is intended to distinguish the code region of this 2D code 130 from the background. Namely, in reading the code 130, the second specific pattern 131 is used as a landmark to distinguish at least the second borders 6c and 6d from the background, thus separating from the background the entire code region with the code blocks 10.

In FIG. 5, the error-correction code blocks 12 are arranged along the first borders 6a and 6b to which the second specific pattern 131 is not contiguous. Specifically, along each of the first borders 6a and 6b, half the cells of any of the error-correction code blocks 12 are arranged. Practically, the fourth error-correction code block 12 is formed as a matrix of 4×2 cells so as to have long edges, one of which long edges is located along the first border 6a. The first error-correction code block 12 is formed as a matrix of 2×4 cells so as to have long edges, one of which long edges is located along the first border 6b.

Additionally, inside the rectangular area, one of the error-correction code blocks 12 is present contiguously to the second specific pattern 131. Practically the third error-correction code block 12 is arranged contiguously to the inward edge of the one specific pattern 132, while the second error-correction code block 12 is arranged contiguously to the inward edge of the other specific pattern 133.

In FIG. 5, no particular applications are given to cells located between the first error-correction code block 12 and the other specific pattern 133, cells located between the fourth error-correction code block 12 and the one specific pattern 132, and cells located contiguously to part of the first specific pattern 2. The arrangement of the code blocks 10 may be changed in FIG. 5 such that these vacant cells are given any specific patterns. Residual blocks, which are not used as data for the code blocks 10, may be arranged in such vacant cells.

In the present embodiment, in addition to the advantages of the first embodiment, the following advantages can be provided.

The 2D code 130 in FIG. 5 has the second specific pattern 131 is present to be contiguous to the second borders 6c and 6d, which differ from the first borders 6a and 6b to which the first specific pattern 2 is contiguous. Hence, during reading the image data, the second borders 6c and 6d can be distinguished accurately using the second specific pattern 131. Further, contiguously to the first borders 6a and 6b, which are apart from the second specific pattern 131, the error-correction code blocks 12 (i.e., contiguous-to-border blocks) are arranged, resulting in that the first borders 6a and 6b can be decided accurately. Additionally, the area where the second specific pattern 131 is not present can be utilized efficiently to broaden the area for the code blocks 10.

The second specific pattern 131 is contiguous to both the two second borders 6c and 6d, so that this pattern 131 can be used to reliably decide the second borders 6c and 6d. Meanwhile, the first borders 6a and 6b can be decided efficiently using both the first specific pattern 2 and the error-correcting blocks 12, while still maintaining the code blocks as much as possible.

The second specific pattern 131 is contiguous to the whole span of the two second borders 6c and 6d, so that the whole span of the second borders can be decided reliably by using the second specific pattern 131. This means that both ends of each of the first borders 6a and 6b can also be decided reliably based on both the first specific pattern 2 and the second specific pattern 131 and the edge portion connecting both ends of each first border can be decided effectively by each error-correction code block 12. Accordingly, the code region (i.e., the rectangular region) can be decided in a highly accurate and reliable manner.

Moreover, some error-correction code blocks 12 are contiguous to the inward edge of the second specific pattern 131. By this arrangement, the second borders 6c and 6d of the code region can be distinguished from the background by using second specific pattern 131 or if necessary, by additionally or solely using some of the error-correction code blocks 12. This suppresses the second borders 6c and 6d from being recognized with less accuracy. For instance, even when the second specific pattern 131 is spoiled by blur, the positions of the error-correction code blocks 12 located next to the pattern 131 can be detected accurately, whereby the positions of the predetermined borders can be estimated, with ease, based on the decided positions of the blocks 12.

Fourth Embodiment

Figure 6:
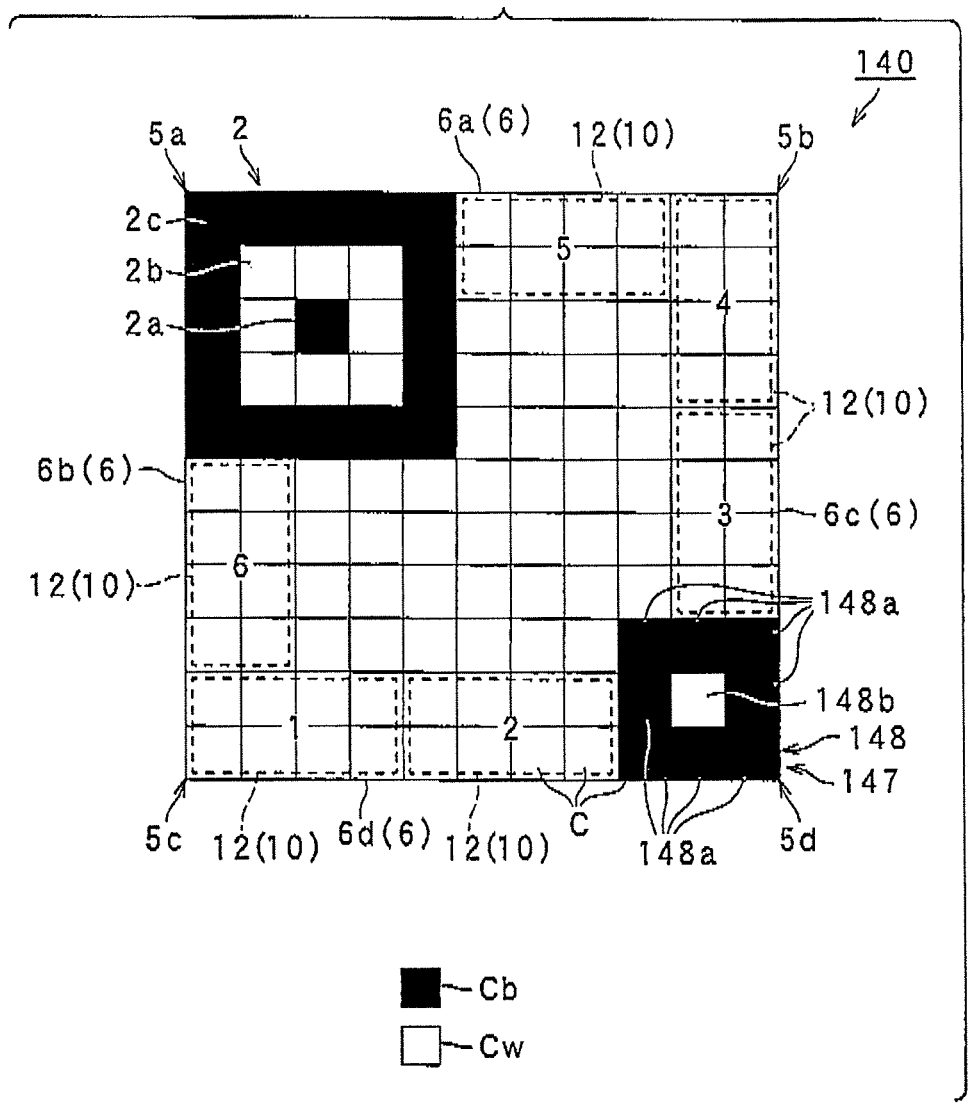
FIG. 6 is an illustration outlining a two-dimensional code according to a fourth embodiment of the present invention.

Referring to FIG. 6, a fourth embodiment will now be described.

FIG. 6 conceptually illustrates a 2D code 140 adopted by the fourth embodiment. In FIG. 6, the positions of the error-correction code blocks 12 are conceptually illustrated by dashed lines, while data code blocks are omitted from being drawn. The data code blocks can be similar to those in the forgoing embodiment, and can be arranged in various ways in the area where any of the first specific pattern 2, an end pattern 147, and the error-correction code blocks 12 are depicted. FIG. 6 is omitted from detailing the cell configurations of the respective code blocks 10.

The 2D code 140 is produced in the same way as that shown in FIG. 1 except that the end pattern 147 is substituted for the end pattern 7 in FIG. 1 and the error-correction code blocks 12 and the data code blocks differ in their shapes and arranging patterns from those use in FIG. 1.

The 2D code 140 has a code region with an 11×11 square matrix, which is the same as the code region of the 2D code 120 described in the second embodiment. Each of the cells C of this 2D code 140 is also a black cell or a white cell. The error-correction code blocks 12 also function as contiguous-to-border blocks, and arranged contiguously to each of the first borders 6a and 6b and each of the second borders 6c and 6d.

The end pattern 147 has a first cell of a predetermined saturation, hue, and lightness and second cells which differ in saturation, hue, or lightness, and is formed as a rectangle 148 as a whole where the second cells enclose the first cell. For example, in FIG. 6, a white cell 148b corresponds to the first cell, while black cells 148a correspond to the second cells. The black cells 148a are eight in number, so these cells 148a enclose the one white cell 148b so as to form the rectangle 148 (precisely, a square). This rectangle 149 has outer edges which compose the corner 5d, which is diagonally opposite to the specified corner 5a. Thus when the outer edge of this rectangle 148 is detected during a reading process for the code, the outer edges, that is, borders of the code region are recognizable in cooperation with the first specific pattern 2.

In the present embodiment, the diagonally located corner 5d can be decided easily. Since the corner 5d is produced by part of the outer edges of the rectangle 148, positionally deciding the rectangle 148 during the reading process allows the second borders 6c and 6d to be recognized at the same time, which second borders 6c and 6d are not contiguous to the first specific pattern 2 but present to compose the corner 5d. Utilizing the end pattern 147, the second borders 6c and 6d can thus be decided easily and reliably.

Figure 7:
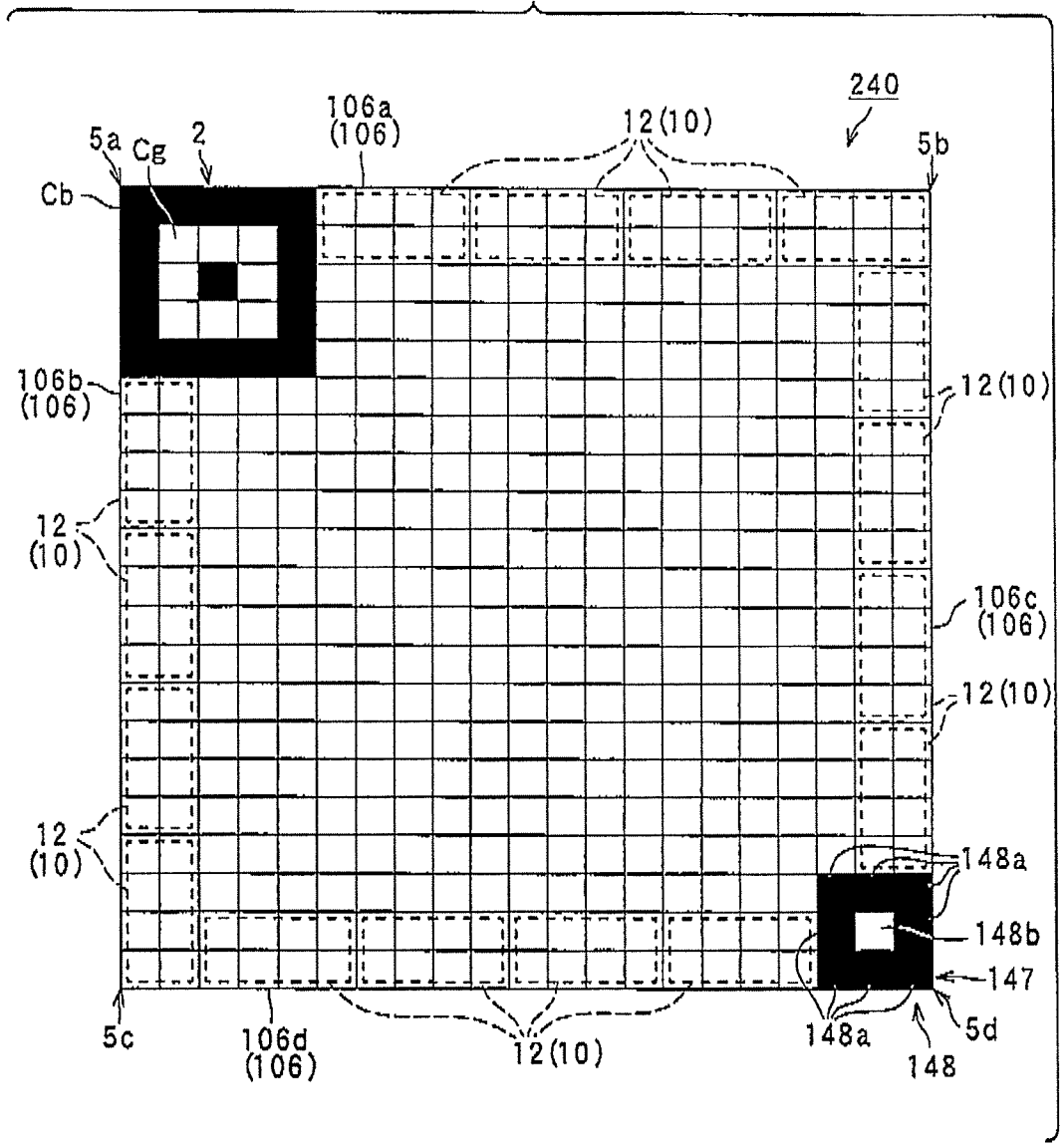
FIG. 7 is an illustration outlining a two-dimensional code according to a modification of the fourth embodiment.

The configuration shown in FIG. 6 may be modified as shown in FIG. 7, where there is provided a 2D code 240. This code 240 differs from the code shown in FIG. 6 in that a matrix size is 21×21 cells and the error-correction code blocks 12 and the data code blocks (not shown) are made and arranged according to its matrix configuration. The first specific pattern 2 and the end pattern 147 are the same as those in FIG. 6. Further, the error-correction code blocks 12 are arranged contiguously to first borders 106a and 106b and second borders 106c and 106d. Of the range of all the borders 106, partial ranges other than ranges contiguous to the first specific pattern 2 and the end pattern 147 are subjected to the contiguous and full arrangement of the error-correction code blocks 12.

Fifth Embodiment

Figure 8:
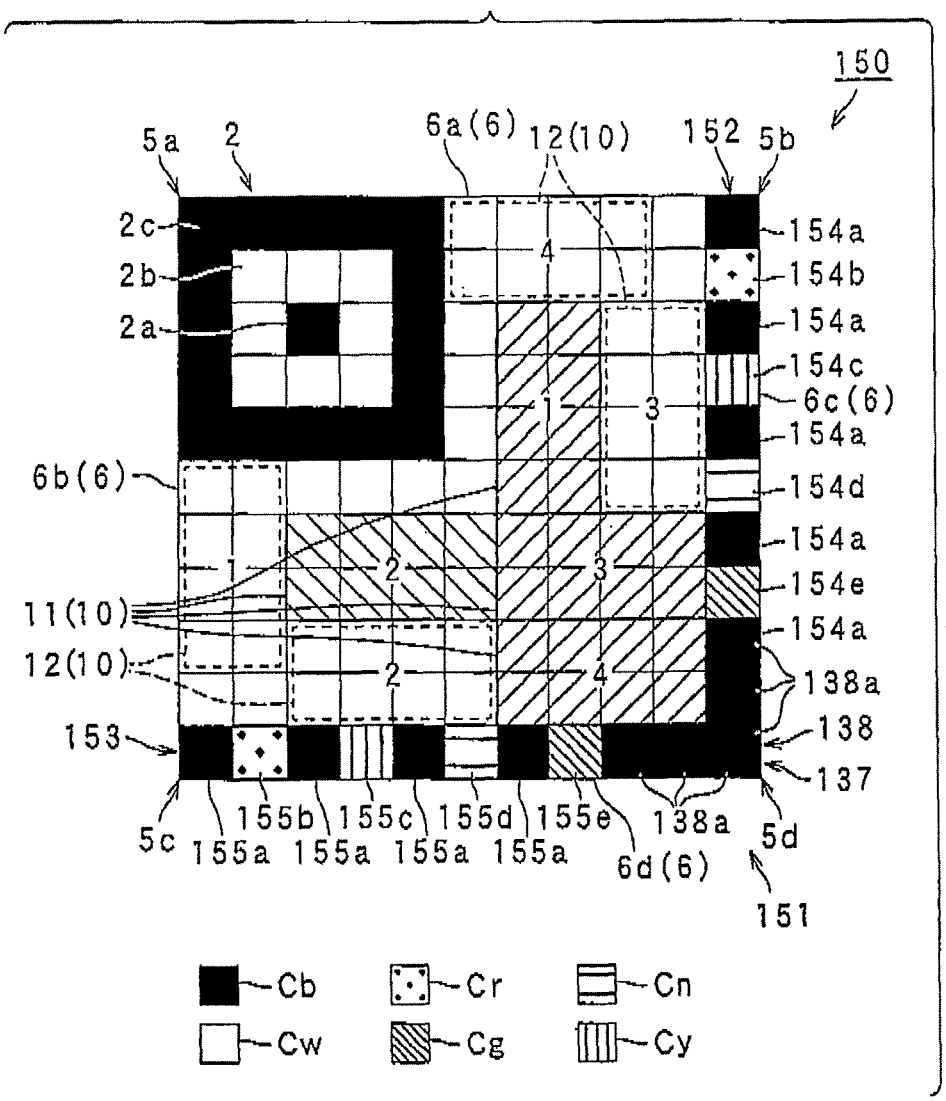
FIG. 8 is an illustration outlining a two-dimensional code according to a fifth embodiment of the present invention.

Referring to FIG. 8, a fifth embodiment will now be described.

FIG. 8 conceptually illustrates a 2D code 150 adopted by the fifth embodiment. In FIG. 8, the positions of the error-correction code blocks 12 are also conceptually illustrated by dashed lines, while data code blocks 11 are conceptually illustrated by solid lines and hatching. FIG. 8 is omitted from detailing the cell configurations of the respective code blocks 10.

The 2D code 150 has the first specific pattern 2, the matrix configuration, and the borders 6 including the corners 5a-5d which are the same as those in FIG. 5. This code 150 has also a code region produced by an L×L matrix (L is the number of cells arranged in one segment thereof), which has a square code region.

The 2D codes in the foregoing various embodiments are composed of two types of cells, while in the present embodiment provides a 2D code 150 is composed of three or more types of cells, which is called a color code. In FIG. 8, the 2D code 150 is composed of eight-color cells consisting of black cells Cb, white cells Cw, red cells Cr, green cells Cg, blue cells Cu, cyan cells Cn, magenta cells Cm, and yellow cells Cy (, however FIG. 8 shows only part of the eight-color cells). This notation for the color cells will be adopted in the succeeding embodiments to the present embodiment.

In using the predetermined eight-color cells, the cells for the data code blocks 11 and error-correction code blocks 12 are given as cells selected from the eighth-color cells. For example, the colors of the cells can be assigned to numeric values; for example, a first color "white" is assigned to data "0", a second color "red" to data "1", a third color "green" to data "2", a fourth color "blue" to data "3", a fifth color "magenta" to data "4", a sixth color "yellow" to data "5", a seventh color "cyan" to data "6", and an eighth color "black" to data "7", respectively. The plural data code blocks 11 and the plural error-correction code blocks 12 have the same matrix configurations as those in FIG. 5 except that those blocks are made up of multicolor cells.

In FIG. 8, the second specific pattern 151 differs from the specific pattern 131 explained in FIG. 5 in that the four white cells 134*b* in FIG. 5 are replaced by a red cell 154*b*, a yellow cell 154*c*, a cyan cell 154*d*, and a green cell 154*e* and the four white cells 135*b* in FIG. 5 are replaced by a red cell 155*b*, a yellow cell 155*c*, a cyan cell 155*d*, and a green cell 155*e*. The shapes of components other than the end pattern 137 in FIG. 5 can be applied to those of the code 150.

The second specific pattern 151 is made by a plurality of types of cells which are mutually different in saturation, hue, or lightness (e.g., a plurality of types of cells having different colors). Those cells are arranged according to predetermined combination types. In this example, the second specific pattern 151 consists of two specific patterns 152 and 153. The one pattern 152, which is located to be contiguous to the second border 6*c*, is composed by mutually combining five types of cells consisting of black cells 154*a* and 138*a*, red cell 154*b*, yellow cell 154*c*, cyan cell 154*d*, and green cell 154*e*, which are lined up in a predetermined order. Specifically, except for the black cells 154*a* and 138*a*, when viewing from the first border 6*a*, the red cell 154*b*, yellow cell 154*c*, cyan cell 154*d*, and green cell 154*e* are present in this order. When containing the black cells 154*a*, the arrangement order starts from the black cell 154*a*, red cell 154*b*, black cell 154*a*, yellow cell 154*c*, black cell 154*a*, cyan cell 154*d*, black cell 154*a*, green cell 154*d*, to black cell 138*a*.

Like the above, the other pattern 153, which is located to be contiguous to the second border 6*d*, is composed by mutually combining five types of cells consisting of black cells 155*a* and 138*a*, red cell 155*b*, yellow cell 155*c*, cyan cell 15*d*, and green cell 155*e*, which are lined up in a predetermined order. Specifically, except for the black cells 155*a* and 138*a*, when viewing from the first border 6*b*, the red cell 155*b*, yellow cell 155*c*, cyan cell 155*d*, and green cell 155*e* are present in this order. When containing the black cells 155*a*, the arrangement order starts from the black cell 155*a*, red cell 155*b*, black cell 155*a*, yellow cell 155*c*, black cell 155*a*, cyan cell 155*d*, black cell 155*a*, green cell 155*d*, to black cell 138*a*.

The second specific pattern 151 is also used as a reference area for referring to types of rectangular regions. This pattern 151 is provided with cells whose colors can be presented in the code region (rectangular region). Such colors include part or all of the colors with the potentiality of being used in the data code blocks 11, the error-correction code blocks 12, and/or other areas. In reading the code, the pattern 151 is subjected to reference for determining the colors of cells provided in the code region. For example, in the reading process, what color among the representative plural colors corresponds to the respective cells of the code region can be decided using the respective cell colors of the second specific pattern 151. An alternative use is that, for a cell whose color has been decided, the respective cell colors of the second specific pattern 151 is used to check whether or not the decision is correct.

In the 2D code 150, the second specific pattern 151 is configured by arranging a plurality of cells of different types in a predetermined order. Hence, it is easier to recognize the arranged shapes of the cells of the pattern 151 in reading the 2D code 150. Additionally, by determining whether or not the order of the cells is consistent with a given order, it is possible to confirm that he second specific pattern 151 has been recognized correctly. The second borders 6*c* and 6*d*, that is, the outer edge of this pattern 151, can thus be decided in terms of the shapes and contents of the cells, that is, the borders, increasing the accuracy of deciding the borders.

Furthermore, the second specific pattern 151, which is composed of the plurality of types of cell described as above, is used as not only a pattern for deciding the borders 6 but also a reference area for referring to types of rectangular regions. It is therefore unnecessary to prepare a sole pattern dedicated to the reference, making the whole code smaller in size or making the area for data larger.

Sixth Embodiment

Figure 9:
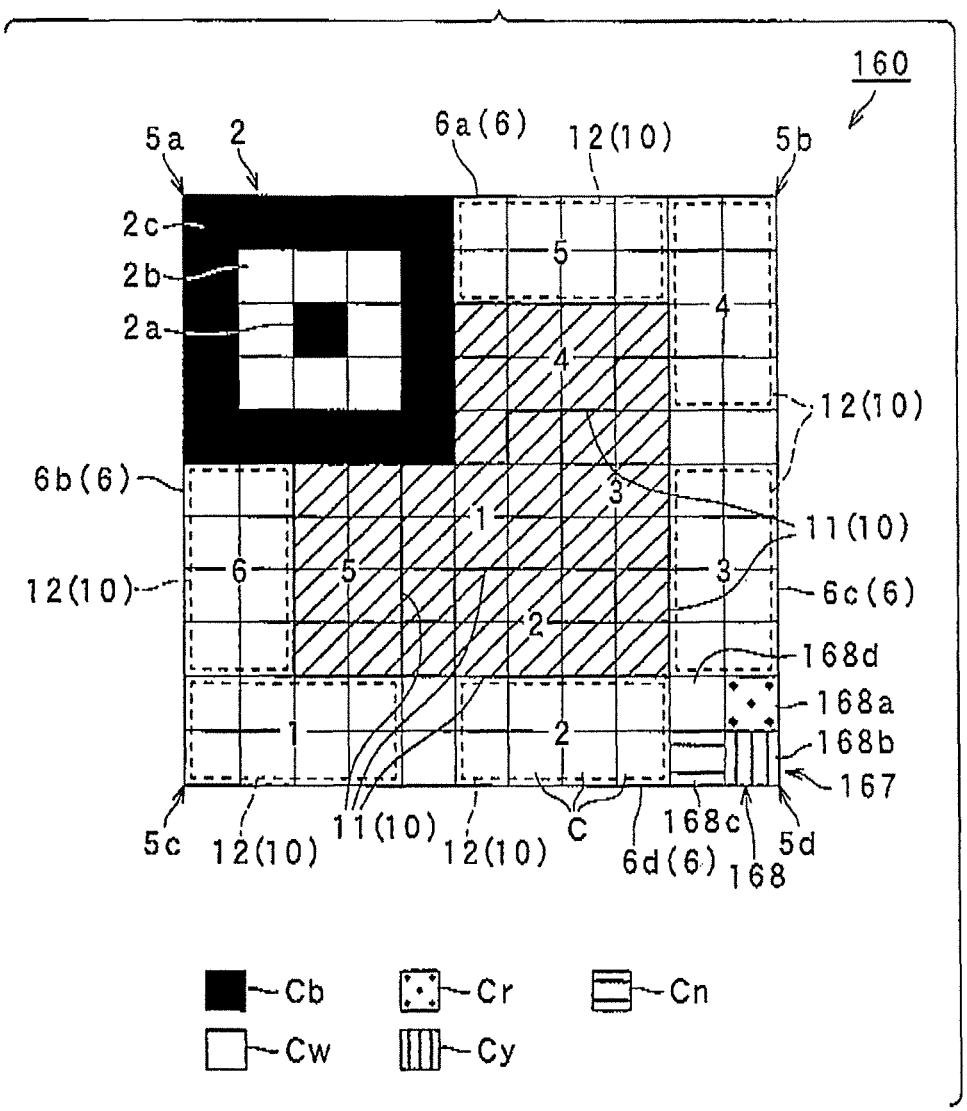
FIG. 9 is an illustration outlining a two-dimensional code according to a sixth embodiment of the present invention.

Referring to FIG. 9, a sixth embodiment will now be described.

FIG. 9 conceptually illustrates a 2D code 160 adopted by the sixth embodiment. In FIG. 9, the positions of the error-correction code blocks 12 are conceptually illustrated by dashed lines, while data code blocks 11 are conceptually illustrated by solid lines and hatching. FIG. 9 is omitted from detailing the cell configurations of the respective code blocks 10.

The 2D code 160 has the first specific pattern 2, the matrix configuration, and the borders 6 including the corners 5*a*-5*d* which are the same as those in FIG. 1. This code 160 has also a code region produced by an L by L matrix (L is the number of cells arranged in one segment thereof), which has a square code region.

Like the code shown in FIG. 8, the 2D code 160 in this embodiment is produced as a color code in which three or more types of cells (e.g., eight types of cells) are employed, which are mutually different in saturation, hue, or lightness. The plural data code blocks 11 and the plural error-correction code blocks 12 have the same matrix configurations as those in FIG. 1, but differ from those in FIG. 1 in that the cells are multicolored with three or more colors.

As shown in FIG. 9, there is provided an end pattern 167, which is changed from the end pattern 7 in FIG. 1. This end pattern 167 is composed of predetermined plural types of cells combined in a predetermined order. Those cells are selected from a plurality of types of cells which mutually differ in saturation, hue, or lightness. In FIG. 9, a red cell 168*a*, a yellow cell 168*b*, and a cyan cell 168*c*, that is, three types of cells, are combined into the end pattern 167, which is arranged so that the red, yellow, and cyan cells 168*a*, 168*b*, and 168*c* are arranged form the corner 5*b* in a clockwise direction. These red, yellow, and cyan cells 168*a*, 168*b*, and 168*c* are aligned in an L-shape to form an L-shaped area 168. This area 168 has an outer edge that composes the corner 5*d* located diagonally to the specified corner 5*a*.

The end pattern 167 is also used as a reference area for reference to types of code regions. Thus the end pattern 167 is provided with possible cells whose colors can be used in the code region. In FIG. 9, such colors include part of possible colors used by cells for the data code blocks 11, error-correction code blocks 12, and/or other members. How to use this end pattern 167 is the same as the second specific pattern 151 explained in the previous embodiment.

As described, the end pattern 167 is made as the L-shaped area 168 and provides the corner 5*d*. Since the end pattern 167 is composed of a plurality of types of cells arranged in the predetermined order, so that it is easier to recognize the cell arranged shape in reading the code and whether or not the end pattern 167 is correctly recognized can be confirmed by checking whether or not the cells is arranged in the predetermined order. The corner 5*d* can be decided positionally in consideration of the shape and contents in colors of the end pattern 167, providing a more improved accuracy in the decision thereof. Since the outer edges of the L-shaped area 168 provides the corner 5*d*, positionally deciding this area 168 leads to recognizing the second borders 6*c* and 6*d*. By using this end pattern 167, the second borders 6*c* and 6*d* can be specified easily and efficiently.

In this way, the end pattern 167 can be used for both purposes described above. Thus, similarly to the previous embodiment, it is not required to have a sole reference area for reference to code region types, increasing the area for data or making the whole code less compact.

Figure 10:
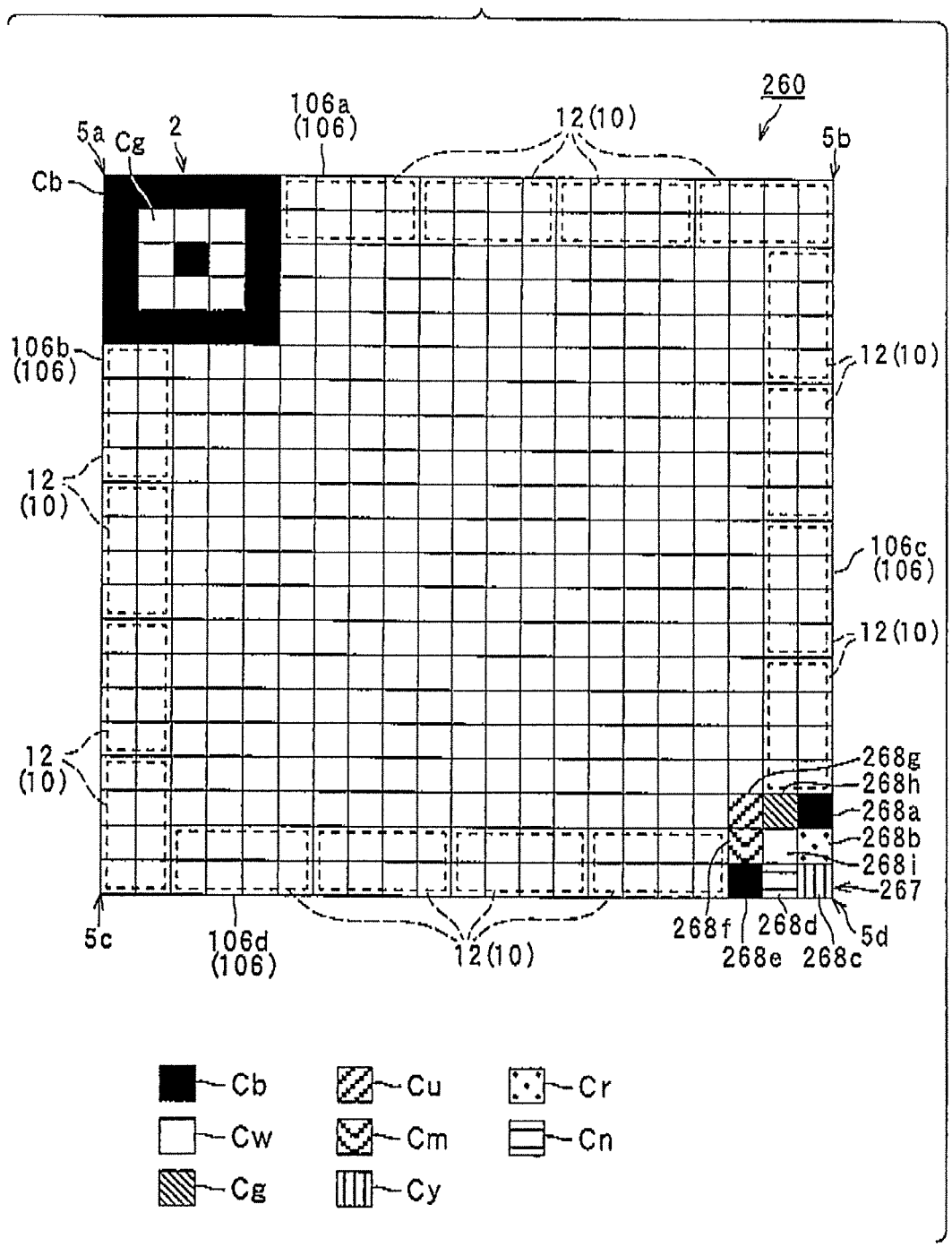
FIG. 10 is an illustration outlining a two-dimensional code according to a modification of the sixth embodiment.

Instead of using the code shown in FIG. 9, a 2D code in FIG. 10 may be adopted, which differs from that in FIG. 7 in that the end pattern 147 is replaced by an end pattern 267 and the cells are composed of cells selected from a plurality of types of cells (for example eight-color cells) which mutually differ in saturation, hue, or lightness (that is, color code). The remaining configurations including the first specific pattern 2, the whole matrix configuration, and the borders 106 including the corners 5*a*-5*d* are the same as those in FIG. 7. The matrixes of Plural data code blocks and plural error-correction code blocks 12, which are used in this code 260, are structured similarly to those in FIG. 7 except for being multiple colored.

The 2D code 260 includes an end pattern 267 formed as a rectangular area 268 delineated by borders consisting of first borders 106*a* and 106*b* and second borders 106*c* and 106*d*. Specifically, when viewing from the corner 5*b*, a black cell 268*a*, a red cell 268*b* and a yellow cell 268*c* are arranged linearly in this order to be contiguous to one of the second borders, 106*c*. The outer edge of the yellow cell 268*c* produces the corner 5*d*. This series of linearly arranged cells 268*a*-268*c* is bent at a right angle at the corner 5*d* and continues to another series of linearly arranged cells starting from the yellow cell 268*c*, a cyan cell 268*d*, and a black cell 268*e* lined up in this order so as to be contiguous to the second border 106*d*. When viewing from the corner 5*c*, the cells are arranged in the order of the back, cyan, and yellow cells. Accordingly, the outer edges of the linearly arranged black, red, and yellow cells 268*a*-268*c* indicate one of the second border, 106*c*, while the outer edges of the linearly arranged yellow, cyan, and black cells 268*c*-268*e* indicate the other second border 106*d*.

Further, from the black cell 268*e* of the series of the yellow, cyan, and black cells 268*c*-268*e*, another series of the black cell 268*e*, a magenta cell 268*f*, and a blue cell 268*g* linearly arranged in this order is extended at the right angle in the direction of the border 106*c*. Furthermore, from this blue cell 268*g*, another series of the blue cell 268*g*, a green cell 268*h*, and the black cell 268*e* linearly arranged in this order starts in the direction of the border 106*d*. Hence, these four series of linearly arranged cells, which are in all composed of the cells 268*a*-268*h* arranged clockwise in the code attitude shown in FIG. 10, form an annular and square area with a center arranged with a white cell 268*i*. In this case, the background is also set to be white. The thus-constructed rectangular area 268 functions as the end pattern 267 and the outer edges of the rectangular area 268 indicate the position of the corner 5*d*.

In this way, the end pattern 267, which is made by arranging a plurality of colors of cells in given order, is also used as a reference area for reference to the colors of the code region. In FIG. 10, all the possible colors of cells (e.g., eight colors), which may be arranged as the data code blocks, error-correction code blocks 12, and/or other members in the code region, are given to the end pattern 267.

Accordingly, the end pattern 267 can be used in the same or similar war as or to the end pattern 167 explained in FIG. 9, and can provide the similar advantages described above.

Other Embodiments

The present invention is not always limited to the scope described with the foregoing various embodiments, but can be modified into various ways including the following modifications.

The forgoing embodiments has provided the examples, where the color of the background surrounding the code region is white and the cells of different colors other than the white are used as cells which differ in saturation, hue, or lightness from the background. This is not a limited example about the color cells, but the background may be black and cells of different colors other than the black used as the cells which differ in saturation, hue, or lightness from the background.

In the examples shown in FIGS. 1, 4, 5, 6 and 7, the 2D code has been exemplified as being composed of the two types of cells consisting of white cells and black cells. As for any of such 2D codes, any bright cells other than the white cells may be used and any dark cells other than the black cells may be used. When bright cells having a particular color are used, the dark cells having other colors lower in lightness can be used.

Figure 11:
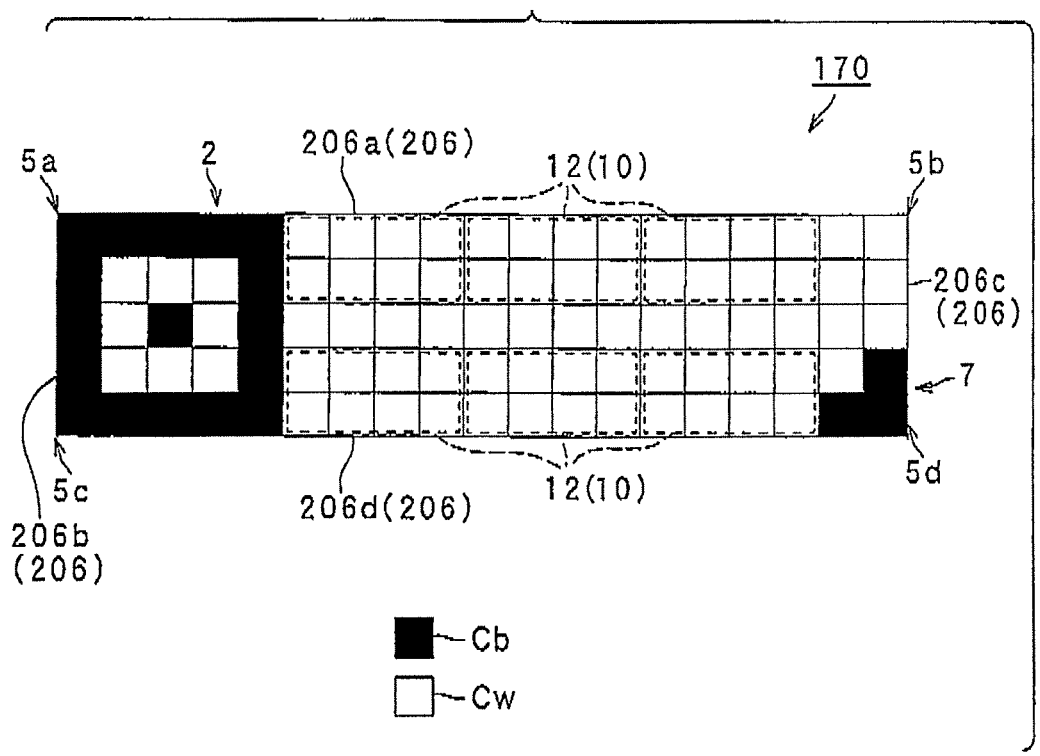
FIG. 11 is an illustration outlining a two-dimensional code according to a modification of the first embodiment, which gives, as a quadrangular area, a rectangular area to the code.

In the foregoing embodiments, the code region has been exemplified as being the square region having a square outer edge. However, this shape may be oblong, as shown in FIG. 11, where there is provided an oblong 2D code 170 having an oblong outer edge. This code 170 has four borders 206, three of which are the first borders 206*a*, 206*b*, and 206*d* contiguous to the first specific pattern 2. One of the first borders, 206*b*, is along only a short side of the pattern 2, while the error-correction code blocks 12 are arranged along the remaining two first borders 206*a* and 206*d* which are also along the long sides of the pattern 2. Error-correction code blocks 12 may be arranged along the second border 206*c*. In FIG. 11, data code blocks are omitted from being drawn. The arrangements and number of error-correction code blocks 12 may be changed, not limited to that shown in FIG. 11.

Figure 12:
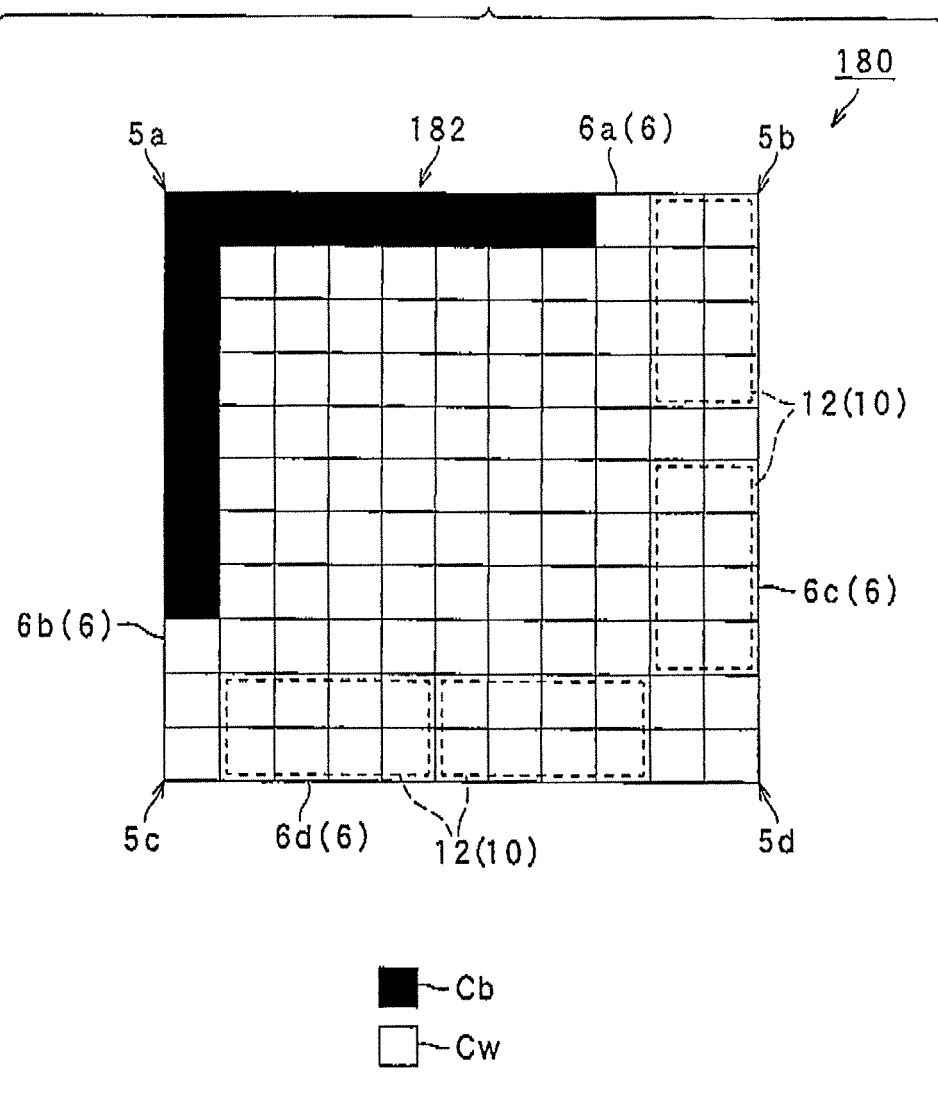
FIG. 12 is an illustration outlining a two-dimensional code according to another modification of the first embodiment, in which the first specific pattern is changed from that shown in FIG. 1.
Figure 13:
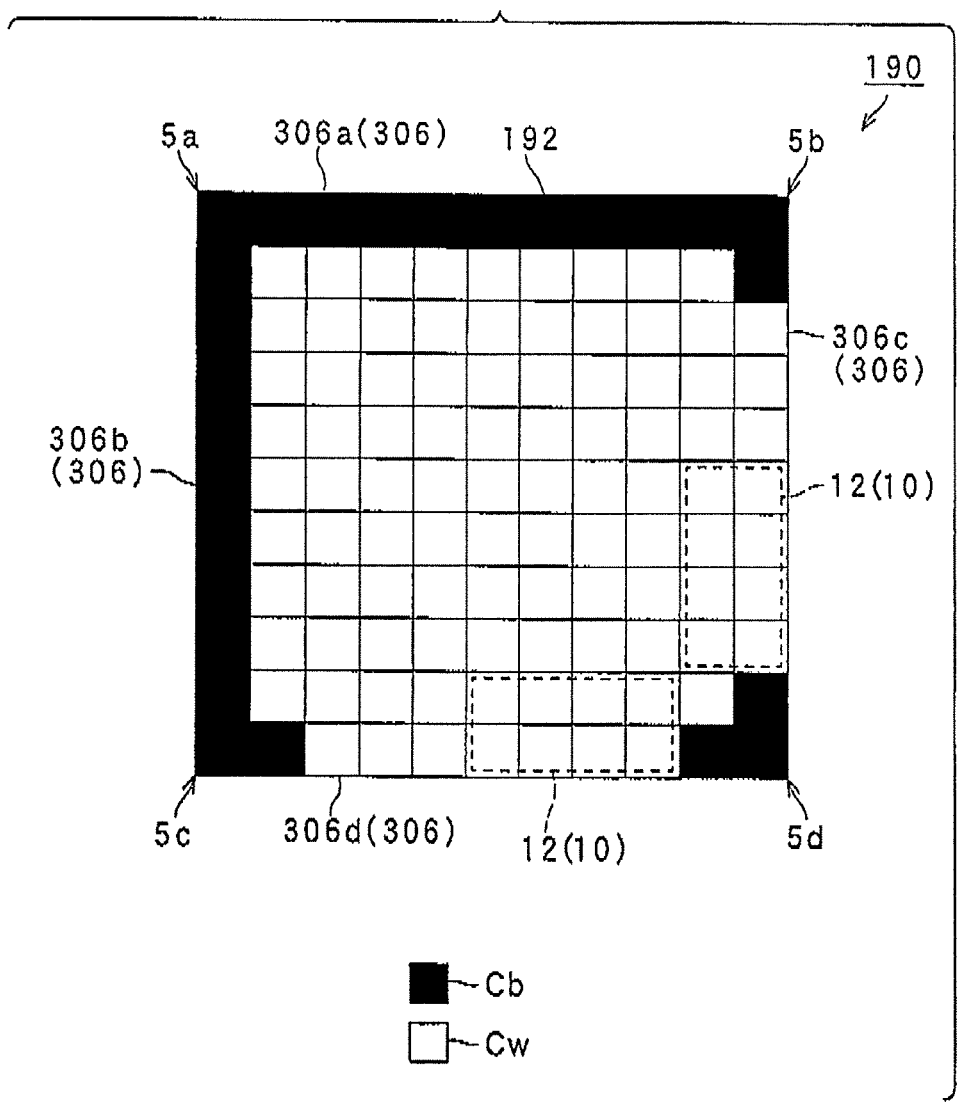
FIG. 13 is an illustration outlining a two-dimensional code according to another modification of the first embodiment, in which the first specific pattern is changed from that shown in FIG. 1.

Further, the foregoing embodiments has adopted the first specific pattern whose outer shape is rectangular, but not restricted to the exemplified ones as long as the pattern is able to define the specified corner 5*a*. Another example for such variations is shown in FIG. 12, where there is provided a first specific pattern 182 having an L-form. This pattern 182 is composed of a series of a plurality of cells which are linearly arranged, the same in type (e.g., black cells), and bent into the L-form. Of course, the cells are made up of a plurality of types of cells. As shown in FIG. 13, the pattern may be almost L-shaped. A first specific pattern 192 shown in FIG. 13 is produced by contiguously combining a plurality of cells of the same type (e.g., black cells) into a substantially L-shaped form with its both ends bent inward slightly. This pattern 192 is arranged to delineate the whole of two borders 306*a* and 306*b* of the code region as well as part of each of the remaining two borders 306*c* and 306*d* thereof. Namely the first specific pattern 192 is able to delineate (or to be contiguous to) all the four borders 306. The error-correction code blocks 12 are arranged to be contiguous to vacant ranges of the borders (i.e., part of each of the borders 306*c* and 306*d*) to which the pattern 192 is contiguous.

The foregoing embodiments have exemplified the code blocks each is an aggregation of eight cells. Any of the data code blocks 11, error-correction code blocks 12, and compressed-data code blocks 13 may be an aggregation of plural cells other than eight cells. For example, seven or less cells (such as two cells, four cells, six cells, or others) may be formed into one block. In contrast, nine or more cells (such as ten cells, sixteen cells, or others) may be formed into one block.

The foregoing embodiments have used, as an error correction method, a method prescribed in JIS. However, other methods may be used if only the methods can correct errors of the data code blocks. In particular, known error-correction methods may be used if only the methods can correct errors by producing error-correction codes based on the contents of data to be decoded (specifically, data words configuring each data code block), and by correcting errors using the data words when errors are caused in a portion of each data code block. For example, a 2D code may be configured so that the data of each code block can be appropriately corrected, using LDPC (low density parity check) codes. In this case, the LDPC codes may be expressed by the above error-correction code blocks, and these error-correction code blocks may be arranged along the peripheries of the rectangular region.

The fifth embodiments have exemplified a configuration in which the second specific pattern is configured as a group. However, the second specific pattern may be divided into a plurality of groups if necessary.

In the third and fifth embodiments, the second specific pattern is set to delineate both two second borders, but may be changed so that the second specific pattern delineate only one of the two second borders.

Further, in the third and fifth embodiments, it is not limited to the case where the error-correcting blocks 12 are arranged contiguously to the inside edges of the second specific pattern 131 or 151. Compressed-data code blocks, which are configured into the same ones as those in the second embodiment, may be arranged contiguously to the inside edge of the third specific pattern. In this case, not only the second specific pattern but also, if needed, the compressed-data code blocks may be used to distinguish the rectangular region from the background, positively reducing degraded recognition of the second borders.

Figure 14:
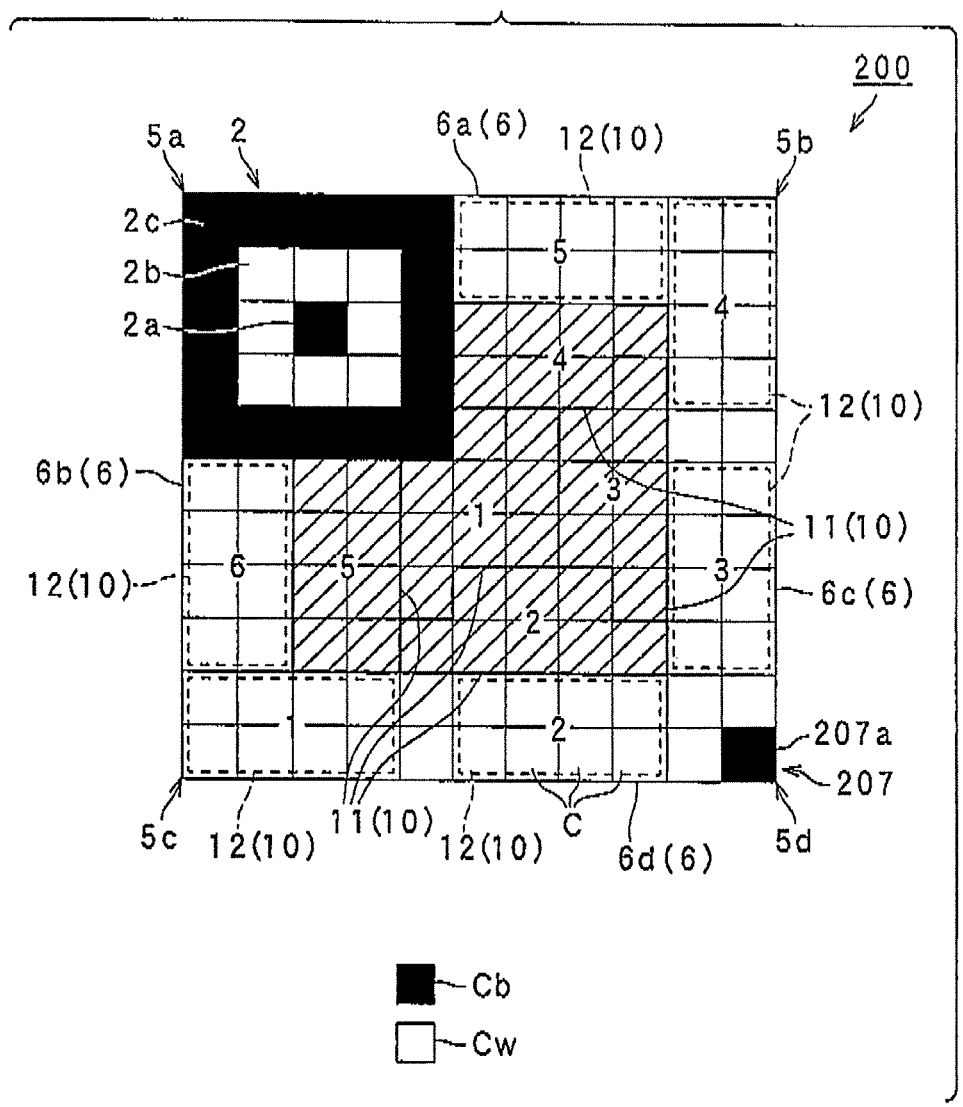
FIG. 14 is an illustration outlining a two-dimensional code according to another modification of the first embodiment, in which the end pattern is made up of a single cell.

The foregoing embodiments have adopted the end pattern composed of plural cells, but this may also be modified. A 2D code 200 in FIG. 14 exemplifies an end pattern 207 composed of a single cell 207a which differs in saturation, hue, or lightness from the background. In FIG. 14, the remaining components and structures are the same as those in FIG. 1. In this case, an area occupied by the end pattern can be reduced as much as possible and an area for data can be widened.

Figure 15:
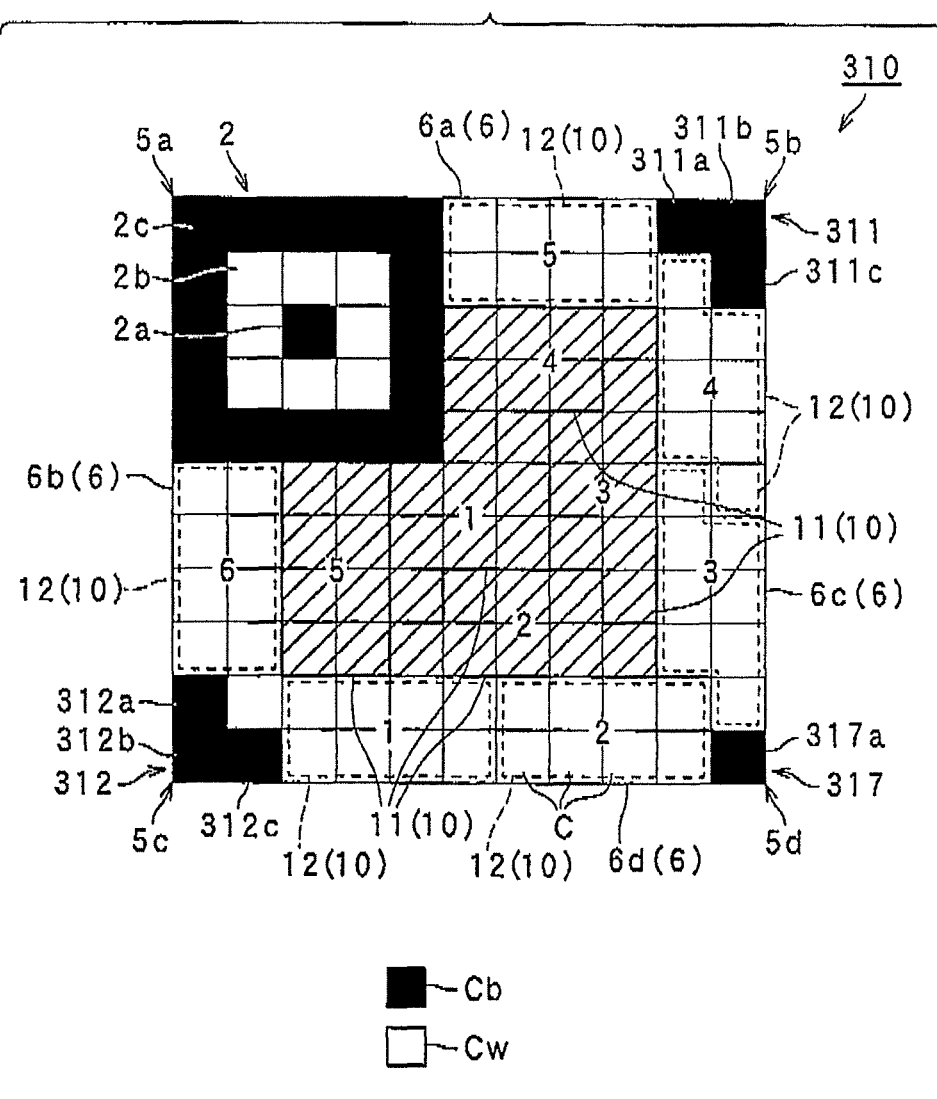
FIG. 15 is an illustration outlining a two-dimensional code according to another modification of the first embodiment, in which the second pattern is provided.

Another modification is shown in FIG. 15. Practically, the configurations shown in FIG. 1 may be changed to those shown in FIG. 15. The 2D code 310 in FIG. 15 differs from that in FIG. 1 in that second end patters 311 and 312 are additionally provided, the end pattern 7 is changed to an end pattern 317, and the error-correction code blocks are changed in their shapes and locations (however, their data contents and functions are the same as those in FIG. 1). The other components including the first specific pattern 2 and the data code blocks 11 are the same as those in FIG. 1.

In FIG. 15, one of the second end patterns, 311, is arranged to indicate the end position of the first border 6a to which one side of the first end pattern 2 is contiguous. This second end pattern 311 is composed of three black cells 311a, 311b and 311c arranged into an L-shape. The cells 311a-311c differ in saturation, hue, or lightness from background (in this example, blight color such as white). Of the three black cells, the cells 311a and 311b are contiguous to the first border 6a. The outside edge of the cell 311b located at the corner of the L-shaped area indicates both the end position of the first border 6a and the position of the corner 5b. In contrast, the black cells 311b and 311c are lined up and contiguous to the second border 6c, so that the outside edge of the central cell 311b indicates the end position of the second border 6c.

Further, the other of the second end patterns, 312, is arranged to indicate the end position of the first border 6b to which the other side of the first end pattern 2 is contiguous. This second end pattern 312 is composed of three black cells 312a, 312b and 312c arranged into an L-shape. The cells 312a-312c differ in saturation, hue, or lightness from background. Of the three black cells, the cells 312a and 312b are contiguous to the first border 6b. The outside edge of the cell 312b located at the corner of the L-shaped area indicates both the end position of the first border 6b and the position of the corner 5c. In contrast, the black cells 312b and 312c are lined up and contiguous to the second border 6d, so that the outside edge of the central cell 312b indicates the end position of the second border 6d.

The end pattern 317 is located to provide the corner 5d diagonal to the specified corner 5a. In this case, this pattern 317 is composed of a single black cell 317a, which differs in saturation, hue, or lightness from the background. Two of the outer edges of this black cell 317a are thus contiguous to the two second borders 6c and 6d, respectively.

The error-correction code blocks 12 are arranged contiguously to the respective borders 6 in the border ranges where there are no contiguity of both of the first specific pattern 2 and the end patterns 317, 311 and 312. Hence, the 2D code 310 shown in FIG. 15 is able to provide the similar advantages to those described in the first embodiment.

In FIG. 15, the data region may be changed such that, for example, the error-correction code blocks 12 are replaced by the compressed-data code blocks 13 described in the second embodiment and the error-correction code blocks 12 are arranged in the area for the data code blocks 11.

Figure 16:
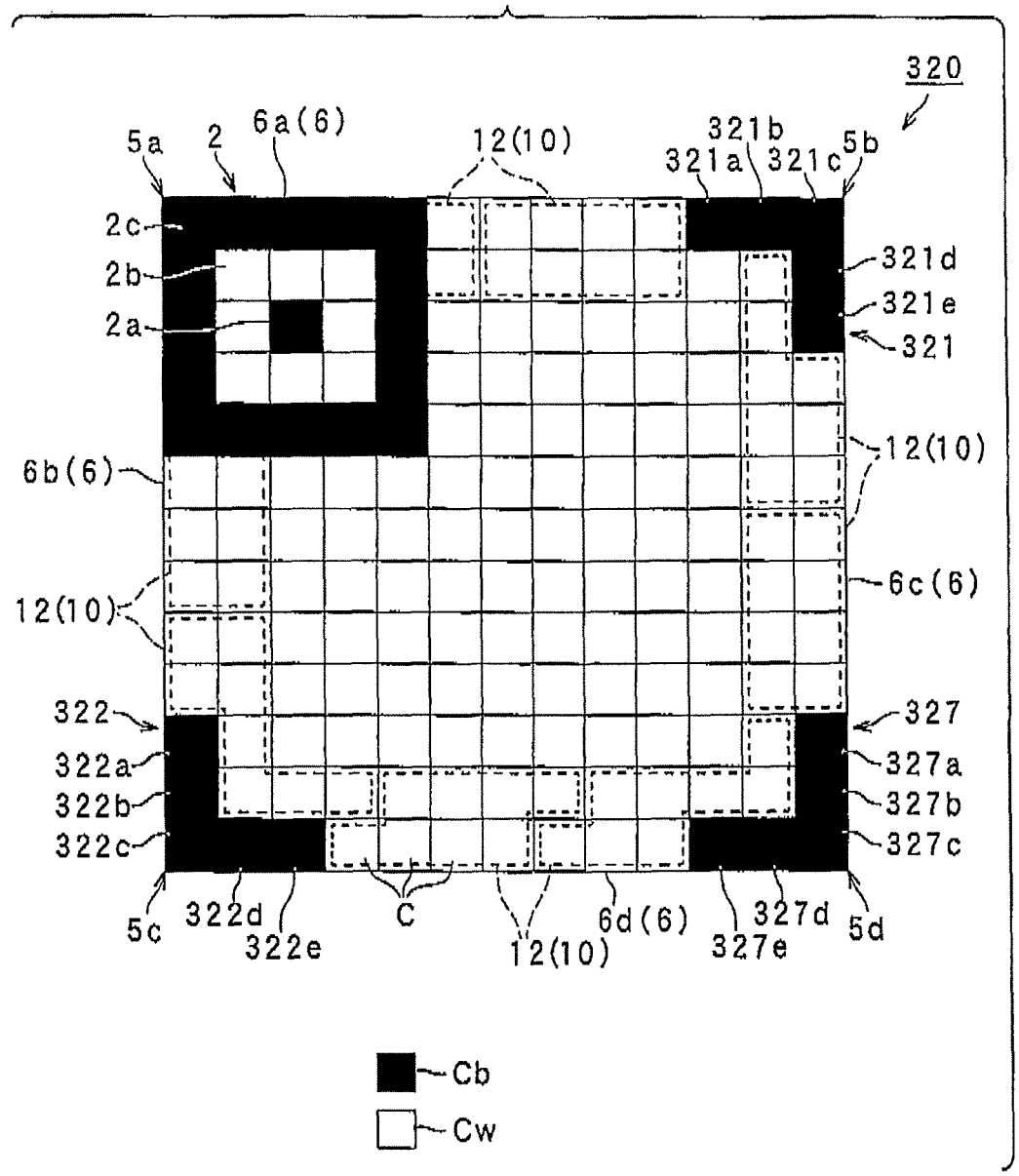
FIG. 16 is an illustration outlining a two-dimensional code according to another modification of the first embodiment, in which the second pattern is provided.

Another modification is shown in FIG. 16. Practically, the configurations in FIG. 1 may be changed to those shown in FIG. 16. In a 2D code 320 in FIG. 16, a matrix size of cells is set to 13×13 cells, two second end patterns 321 and 322 are additionally provided, an end pattern 327 is provided instead of the end pattern 7, and the error-correction code blocks 12 and the data code blocks 11 are changed in their shapes, locations and numbers (however, their data contents and functions are the same as those in FIG. 1). The other components including the first specific pattern 2 are the same as those in FIG. 1. In FIG. 16, the data code blocks 11 (refer to FIG. 1) are omitted from being drawn, but, of course, can be arranged in an area with no error-correction code blocks 12.

In FIG. 16, one of the second end patterns, 321, is arranged to indicate the end position of the first border 6a to which one side of the first end pattern 2 is contiguous. This second end pattern 321 is composed of five black cells 321a-321e arranged into an L-shape. The cells 321a-321e differ in saturation, hue, or lightness from the background (in this example, a bright color such as white). Of the five black cells, the cells 321a-321c are lined up and contiguous to the first border 6a. The outside edge of the cell 321c located at the corner of the L-shaped area indicates both the end position of the first border 6a and the position of the corner 5b. In contrast, the black cells 321c-321e are lined up and contiguous to the second border 6c, so that the outside edge of the cell 321c indicates the end position of the second border 6c.

Further, the other of the second end patterns, 322, is arranged to indicate the end position of the first border 6b to which the other side of the first end pattern 2 is contiguous. This second end pattern 322 is composed of five black cells 322a-322e arranged into an L-shape. The cells 322a-322e differ in saturation, hue, or lightness from the background. Of the five black cells, the cells 322a-322c are lined up and contiguous to the first border 6b. The outside edge of the cell 322c located at the corner of the L-shaped area indicates both the end position of the first border 6b and the position of the corner 5c. In contrast, the black cells 322c-322e are lined up and contiguous to the second border 6d, so that the outside edge of the cell 322c indicates the end position of the second border 6d.

The end pattern 327 is located to provide the corner 5d diagonal to the specified corner 5a. In this case, this pattern 327 is composed of five black cells 327a-327e arranged into an L-shape form, which differ in saturation, hue, or lightness from the background. Of the black cells, the cells 327a-327c are lined up and contiguous to the second border 6c. The outer edge of the cell 327c indicates the end position of one of the second borders, 6c, and the position of the corner 5d. In contrast, the other set of black cells 327c-327d are lined up and contiguous to the other second border 6d, so that the cell 327c indicates the end position of the second border 6d.

The error-correction code blocks 12 are arranged contiguously to the respective borders 6 in the border ranges where there are no contiguity of both of the first specific pattern 2 and the end patterns 327, 321 and 322. Hence, the 2D code 320 shown in FIG. 16 is able to provide the similar advantages to those described in the first embodiment.

In FIG. 16, the data region may be changed such that, for example, the error-correction code blocks 12 are replaced by the compressed-data code blocks 13 described in the second embodiment and the error-correction code blocks 12 are arranged in a central area of the rectangular region.

In the above description, some examples of the first specific pattern have been described, which can be seen in FIGS. 1, 12 and 13, for example. However, the first specific pattern may be modified into other various modes. As long as those modes are able to provide a specific arrangement pattern of the cells which differ in saturation, hue, or lightness from the background and point out the corner 5a, the first specific pattern may be changed in their colors, number of cells, shape, arrangement order, and others.

In the above description, some examples of the second specific pattern have been described, which can be seen in FIGS. 1 and 8, for example. However, the second specific pattern may be modified into other various modes. As long as those modes are able to provide a specific arrangement pattern of the cells which differ in saturation, hue, or lightness from the background, the second specific pattern may be changed in colors, number of cells, shape, arrangement order, and others.

In the above description, some examples of the end specific pattern have been described, which can be seen in FIGS. 1, 5, 6, 8, 10 and 14, for example. However, the end pattern may be modified into other various modes. As long as those modes are able to provide a specific arrangement pattern of the cells which differ in saturation, hue, or lightness from the background, the end pattern may be changed in colors, number of cells, shape, arrangement order, and others.

What is claimed is:

1. A two-dimensional code to be decoded by a decoder, comprising:
    a rectangular region delineated on an object by a border consisting of four border lines connected with each other to provide a rectangular region with four corners;
    a plurality of code blocks each composed of a plurality of cells aggregated together and arranged in the rectangular region; and
    a single first specific pattern used to specify positions of the cells, the first specific pattern having edges and being located at one of the corners such that the edges of the first specific pattern occupy at least a part of each of two border lines of the border lines,
    wherein the plurality of code blocks include data code blocks in which data are encoded and error-correction code blocks to correct an error of the data, the error-correction code blocks having edges and being arranged continuously along and contiguously to a remaining part of the border lines, the remaining part of the border lines being other than the edges of the first specific pattern which partially occupy the one or more border lines, the edges of the error-correction code blocks having outer edges forming all the remaining part of the border lines, the data code blocks being arranged to be surrounded by the error-correction code blocks in the rectangular region.

2. The two-dimensional code of claim 1, wherein one or more of the error-correction code blocks are arranged along each of the border lines of the rectangular region.

3. The two-dimensional code of claim 1, wherein
    the border lines of the rectangular region includes first border lines along part of which the first specific pattern is arranged and
    one or more of the error-correction code blocks are arranged along the first border lines.

4. The two-dimensional code of claim 3, comprising a second specific pattern used to distinguish the code blocks from a background to the code, the background being a surface of the object,
    wherein the border lines of the rectangular region include two second border lines which are different from the first border lines and along one or more of which the second specific pattern is arranged, and
    one or more of the error-correction code blocks are arranged, at least, along each of the first border lines.

5. The two-dimensional code of claim 4, wherein one or more of the error-correction code blocks are arranged along an inside edge of the second specific pattern.

6. The two-dimensional code of claim 4, wherein the second border lines are two in number and the second specific pattern is arranged along any one of the two second border lines.

7. The two-dimensional code of claim 6, wherein the second specific pattern is arranged to be over the two second border lines.

8. The two-dimensional code of claim 4, wherein the second specific pattern includes a plurality of types of cells which are, at least, different in saturation, hue, or lightness from each other.

9. The two-dimensional code of claim 8, wherein the plurality of types of cells are arranged in a predetermined order.

10. The two-dimensional code of claim 4, wherein
    the rectangular region contains, as the cells, a plurality of type of cells arranged therein, the plurality of types of cells being different in saturation, hue, or lightness from each other, and
    the second pattern is composed of a plurality of types of cells which are different in saturation, hue, or lightness from each other and arranged in a predetermined combination of types of cells so as to also serve a reference area for reference to types of the rectangular region.

11. The two-dimensional code of claim 3, wherein the first border line consists of two first border lines which are orthogonal with each other and the edges of the first specific pattern form part of each of the two first border lines.

12. The two-dimensional code of claim 11, comprising an end pattern located at a corner which is present diagonally to the first specific pattern in the rectangular region, the end pattern indicating a diagonal position of the rectangular region to the first specific pattern.

13. The two-dimensional code of claim 1, comprising an end pattern located at a corner which is present diagonally to the first specific pattern in the rectangular region, the end pattern indicating a diagonal position of the rectangular region to the corner at which the first specific pattern is located.

14. The two-dimensional code of claim 13, wherein the end pattern has an L-shaped area composed of a plurality of cells which are the same in saturation, hue, and lightness with each other and which are mutually contiguously arranged to depict an L-shape and the L-shaped area has an outer edge that composes the corner diagonal to the specified corner.

15. The two-dimensional code of claim 13, wherein the end pattern is composed of a single cell which is different in saturation, hue, or lightness from a background to the code, the background being a surface of the object.

16. The two-dimensional code of claim 13, wherein the end pattern has an L-shaped area composed of a plurality of cells which are different in saturation, hue, or lightness from each other and which are mutually contiguously arranged to depict an L-shape and the L-shaped area has an outer edge that composes the corner diagonal to the specified corner.

17. The two-dimensional code of claim 13, wherein the end pattern has a first cell of a predetermined saturation, hue and lightness and a second cell which is different in saturation, hue, or lightness from the first cell,
wherein the second cell is shaped as a rectangular area enclosing the first cell so that the first cell is located at a center of the rectangular area and the rectangular area has an outer edge that composes the corner located diagonally to the corner at which the first specific pattern is arranged.

18. The two-dimensional code of claim 13, wherein
the rectangular region contains, as the cells, a plurality of type of cells arranged therein, the plurality of types of cells being different in saturation, hue, or lightness from each other, and
the end pattern is composed of a plurality of types of cells which are different in saturation, hue, or lightness from each other and arranged in a predetermined combination of types of cells so as to also serve a reference area for reference to types of the rectangular region.

19. A two-dimensional code to be decoded by a decoder, wherein the code comprises:
a rectangular region delineated on an object by a border consisting of four border lines connected with each other to provide a rectangular region with four corners;
a plurality of code blocks each composed of a plurality of cells aggregated together and arranged in the rectangular region; and
a single first specific pattern used to specify positions of the cells, the first specific pattern having edges and being located at one of the corners such that the edges of the first specific pattern occupy at least a part of each of two border lines of the border lines,
wherein the plurality of code blocks include compressed-data code blocks in which data are encoded and compressed and other data blocks necessary for forming the code, the compressed-data code blocks having edges and being arranged continuously along and contiguously to a remaining part of the border lines, the remaining part of the border lines being other than the edges of the first specific pattern, the edge of the compressed-data code blocks having outer edges forming all the remaining part of the border lines, the other data blocks being arranged to be surrounded by the compressed-data code blocks in the rectangular region.

20. The two-dimensional code of claim 19, wherein one or more of the compressed-data code blocks are arranged along each of the border lines of the rectangular region.

21. The two-dimensional code of claim 19, wherein
the border lines of the rectangular region includes first border lines long part of which the first specific pattern is arranged and
one or more of the compressed-data code blocks are arranged along the first border lines.

22. The two-dimensional code of claim 21, comprising a second specific pattern used to distinguish the code blocks from a background to the code, the background being a surface of the object,
wherein the border lines of the rectangular region include plural second border lines which are different from the first border lines and along one or more of which the second specific pattern is arranged, and
one or more of the compressed-data code blocks are arranged, at least, along each of the first border lines.

23. The two-dimensional code of claim 22, wherein one or more of the compressed-data code blocks are arranged along an inside edge of the second specific pattern.

24. The two-dimensional code of claim 21, wherein the first border line consists of two first border lines which are orthogonal with each other and the edges of the first specific pattern partially form part of each of the two first border lines.

25. The two-dimensional code of claim 24, comprising an end pattern located at a corner which is present diagonally to the first specific pattern in the rectangular region, the end pattern indicating a diagonal position of the rectangular region to the first specific pattern.

26. The two-dimensional code of claim 19, wherein the other data blocks are error-correction code blocks to correct an error of the data.

* * * * *